(12) United States Patent
Murakami et al.

(10) Patent No.: US 7,287,038 B2
(45) Date of Patent: Oct. 23, 2007

(54) RECORDING APPARATUS, FILE MANAGEMENT METHOD, PROGRAM FOR FILE MANAGEMENT METHOD, RECORDING MEDIUM HAVING PROGRAM FOR FILE MANAGEMENT METHOD RECORDED THEREON

(75) Inventors: Masaharu Murakami, Tokyo (JP); Haruo Yoshida, Kanagawa (JP); Hiroshi Jinno, Tokyo (JP); Mitsuhiro Hirabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 10/786,809

(22) Filed: Feb. 25, 2004

(65) Prior Publication Data
US 2004/0172416 A1   Sep. 2, 2004

(30) Foreign Application Priority Data
Feb. 27, 2003   (JP)   ............................ P2003-050609

(51) Int. Cl.
*G06F 17/00*   (2006.01)
(52) U.S. Cl. .................... 707/102; 707/101; 707/104.1

(58) Field of Classification Search .................... None
See application file for complete search history.

(56) References Cited

U.S. PATENT DOCUMENTS

| 5,805,588 A * | 9/1998 | Petersen .................... 370/356 |
| 2003/0219019 A1* | 11/2003 | Wilson ..................... 370/395.1 |
| 2004/0095907 A1* | 5/2004 | Agee et al. .................. 370/334 |
| 2004/0172383 A1* | 9/2004 | Yoshida et al. ................. 707/2 |

FOREIGN PATENT DOCUMENTS

| JP | 11 126462 | 5/1999 |
| JP | 2003 50811 | 2/2003 |

* cited by examiner

*Primary Examiner*—Sana Al-Hashemi
(74) *Attorney, Agent, or Firm*—Frommer Lawrence & Haug LLP; William S. Frommer

(57) ABSTRACT

A recording apparatus and a file management method are disclosed which can be applied typically to an optical disk apparatus and make it possible to grasp a hierarchical structure readily and register or delete extract information simply and easily. Reference information pointing to slots of a higher hierarchy, a lower hierarchy and the same hierarchy is set, and a flag is set to delete or register extract information without varying the reference information.

9 Claims, 15 Drawing Sheets

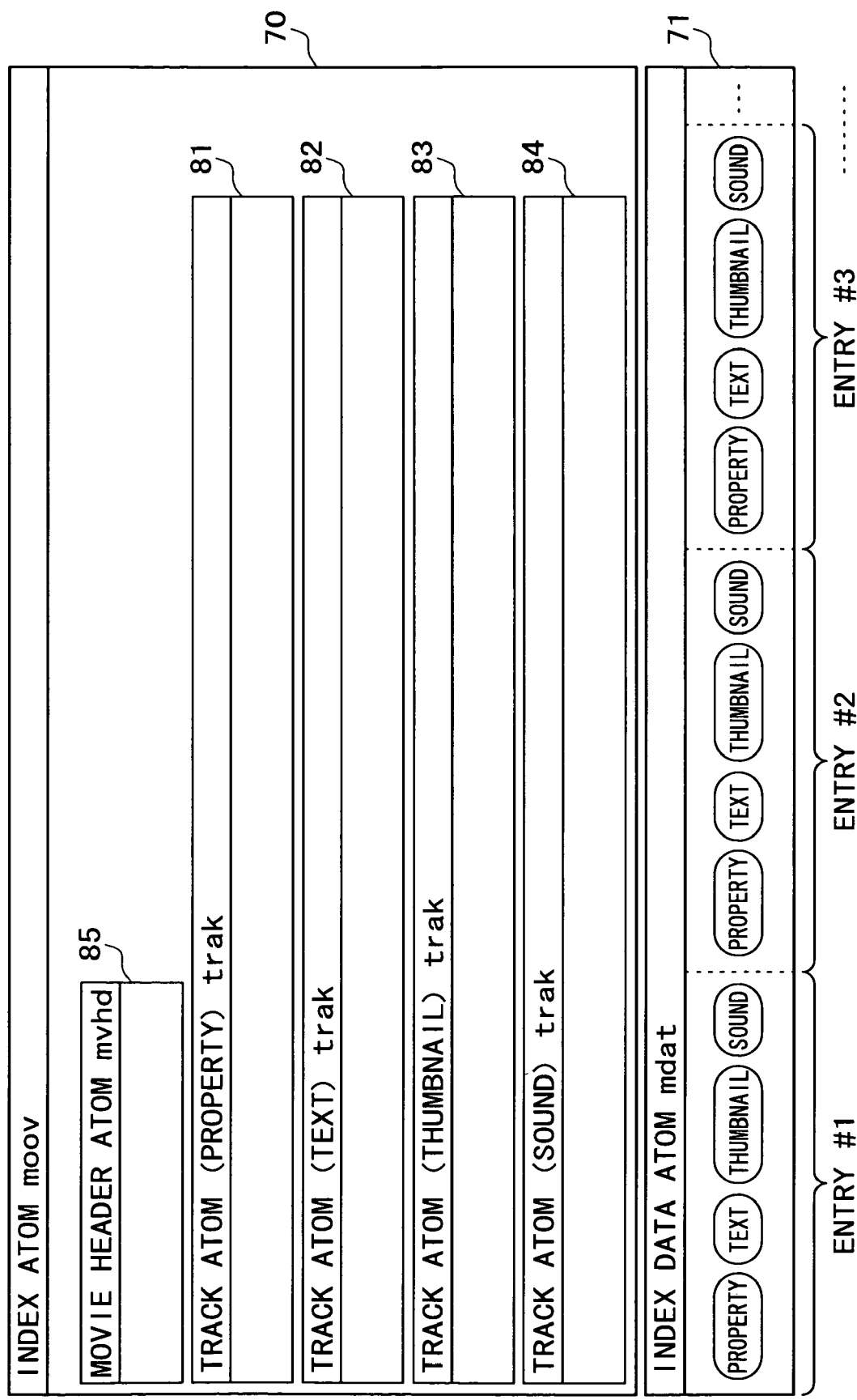

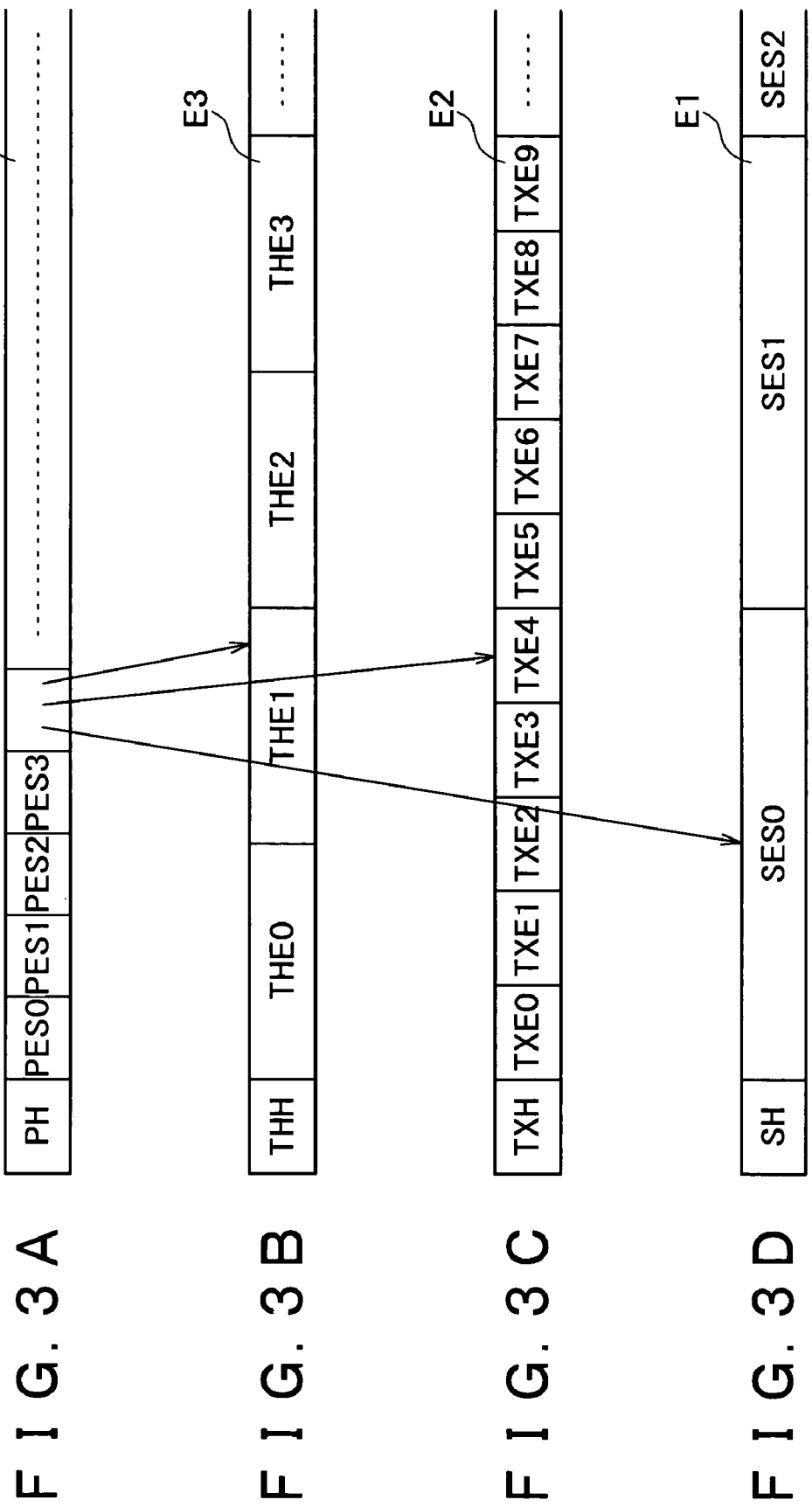

| Entry Number | 0 | 1 | 2 | 3 | 4 | 5 | 6 | 7 |
|---|---|---|---|---|---|---|---|---|
| PE-Flags 0:Valid 1:Invalid | 0 | 0 | 0 | 0 | 0 | 0 | 0 | 0 |
| 0:Folder 1:File | 0 | 1 | 1 | 0 | 0 | 1 | 0 | 1 |
| Parent Entry Number | X | 0 | 0 | 0 | 3 | 3 | 4 | 4 |
| Child Entry Number | 3 | 0 | 0 | 4 | 6 | 0 | 0 | 0 |
| Sibling Entry Number | X | 2 | 0 | 1 | 5 | 4 | 7 | 6 |

| Entry Number | | 0 | 1 | 2 | 3 | 4 | 5 | 6 | 7 |
|---|---|---|---|---|---|---|---|---|---|
| PE-Flags | 0:Valid  1:Invalid | 0 | 1 | 0 | 0 | 0 | 0 | 0 | 0 |
| | 0:Folder  1:File | 0 | 1 | 1 | 0 | 0 | 1 | 1 | 1 |
| Parent Entry Number | | X | 0 | 0 | 0 | 3 | 3 | 4 | 4 |
| Child Entry Number | | 3 | 0 | 0 | 4 | 6 | 0 | 0 | 0 |
| Sibling Entry Number | | X | 2 | 3 | 1 | 5 | 4 | 7 | 6 |

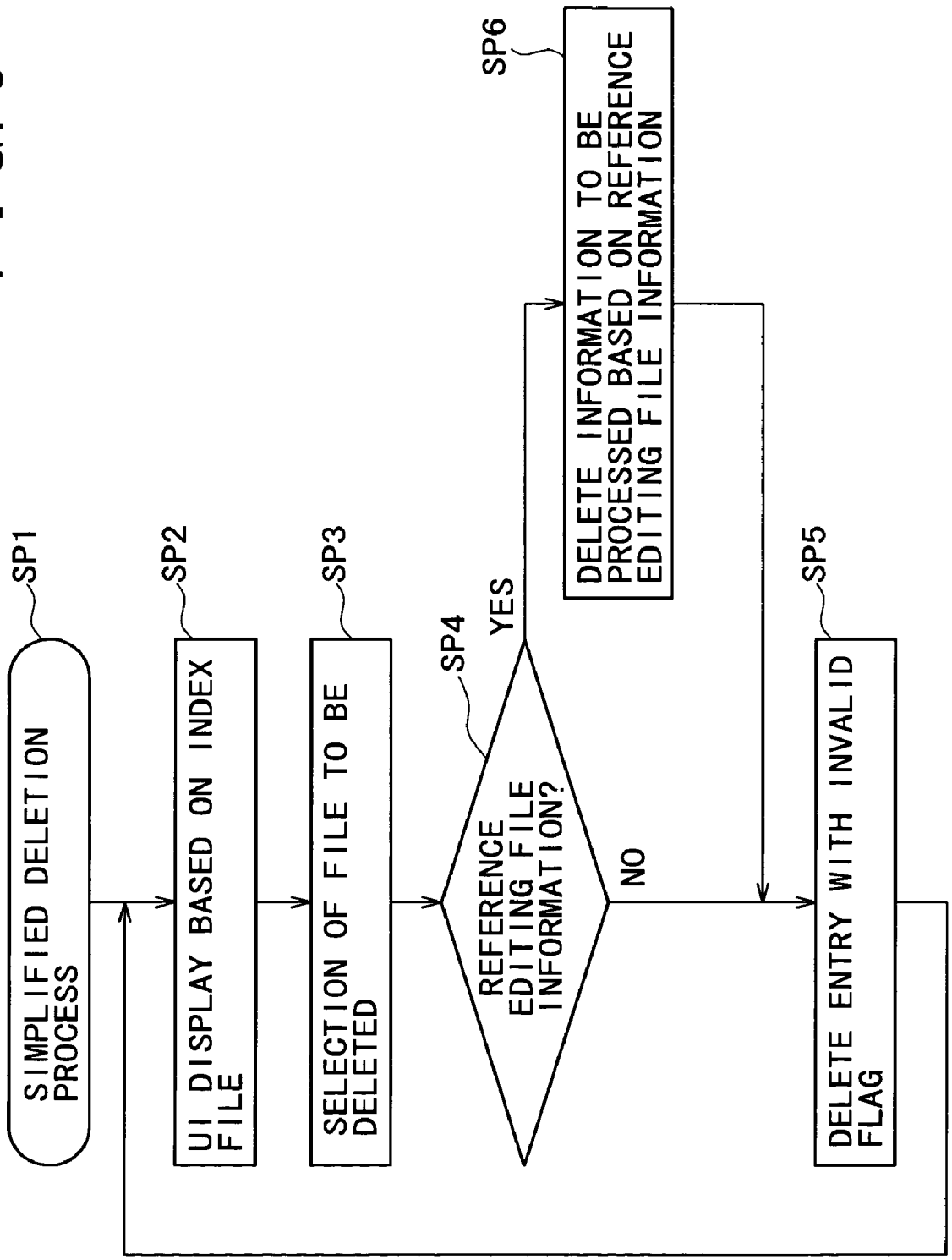

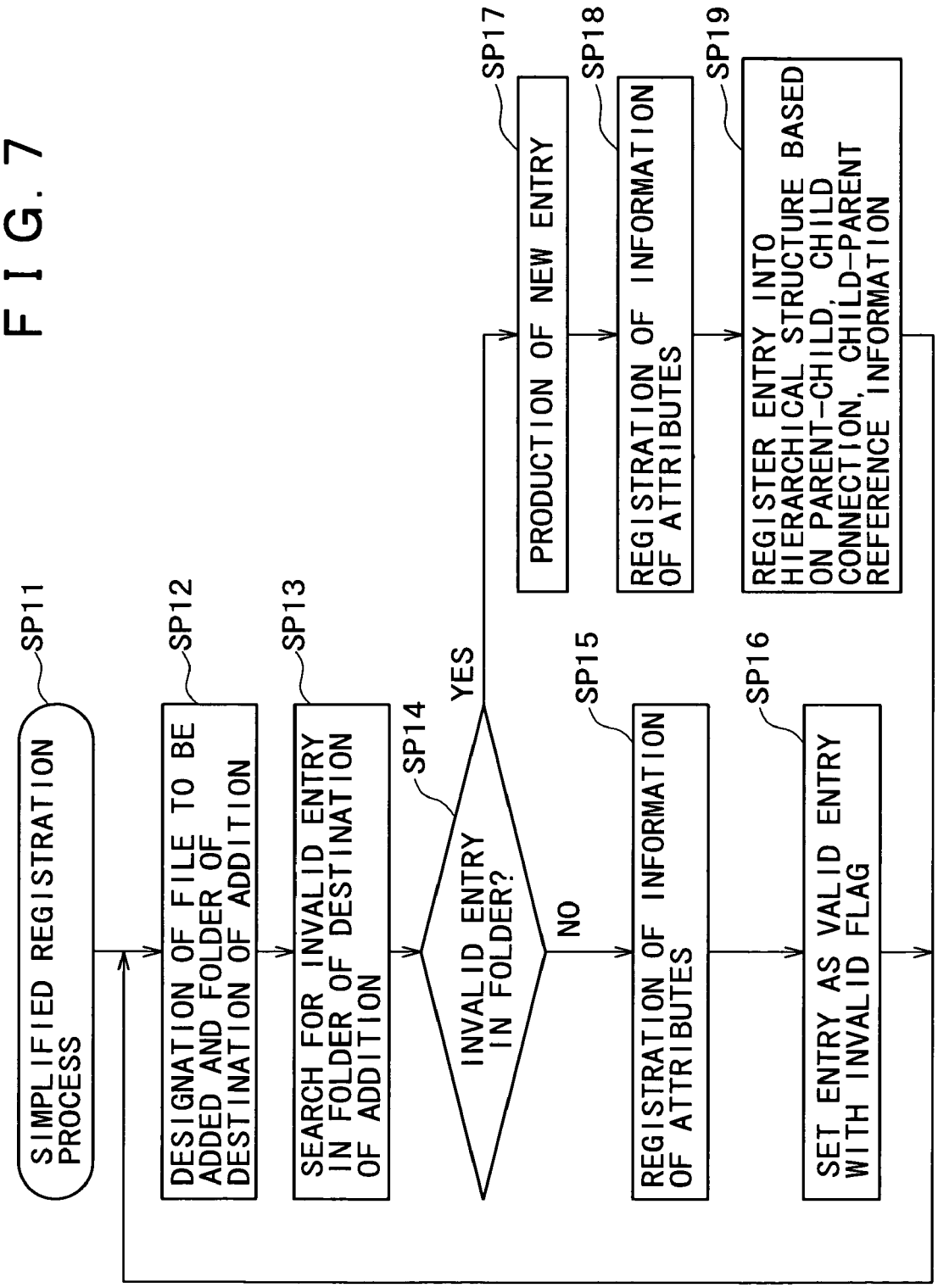

FIG. 8

| Entry Number | | 0 | 1 | 2 | 3 | 4 | 5 | 6 | 7 | 8 |
|---|---|---|---|---|---|---|---|---|---|---|
| PE-Flags | 0:Valid 1:Invalid | 0 | 1 | 0 | 0 | 0 | 0 | 0 | 0 | 0 |
| | 0:Folder 1:File | 0 | 1 | 1 | 0 | 0 | 1 | 1 | 1 | 1 |
| Parent Entry Number | | x | 0 | 0 | 0 | 3 | 3 | 4 | 4 | 0 |
| Child Entry Number | | 3 | 0 | 0 | 4 | 6 | 0 | 0 | 0 | 0 |
| Sibling Entry Number | | x | 2 | 3 | 1 | 5 | 4 | 7 | 6 | 0 |

FIG. 9A
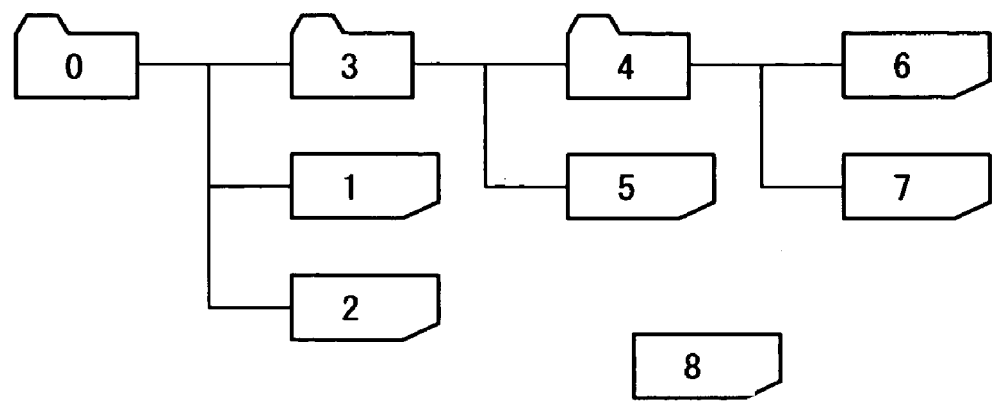
FIG. 9B
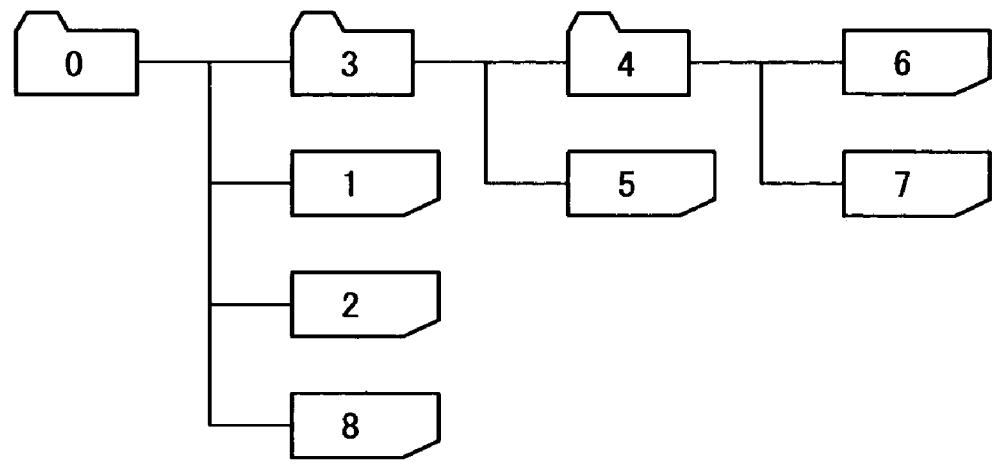
 : FOLDER
 : FILE

| Entry Number | 0 | 1 | 2 | 3 | 4 | 5 | 6 | 7 | 8 |
|---|---|---|---|---|---|---|---|---|---|
| PE-Flags 0:Valid 1:Invalid | 0 | 1 | 0 | 0 | 0 | 0 | 0 | 0 | 0 |
| PE-Flags 0:Folder 1:File | 0 | 1 | 1 | 0 | 0 | 1 | 1 | 1 | 1 |
| Parent Entry Number | X | 0 | 0 | 0 | 3 | 3 | 4 | 4 | 4 |
| Child Entry Number | 3 | 0 | 0 | 4 | 6 | 0 | 0 | 0 | 0 |
| Sibling Entry Number | X | 2 | 3 | 1 | 5 | 4 | 7 | 8 | 6 |

| Entry Number | | 0 | 1 | 2 | 3 | 4 | 5 | 6 | 7 |
|---|---|---|---|---|---|---|---|---|---|
| PE-Flags | 0:Valid  1:Invalid | 0 | 0 | 0 | 0 | 0 | 0 | 0 | 1 |
| | 0:Folder  1:File | 0 | 1 | 1 | 0 | 0 | 1 | 1 | 1 |
| Parent Entry Number | | x | 0 | 0 | 0 | 3 | 3 | 0 | 0 |
| Child Entry Number | | 3 | 0 | 0 | 4 | 0 | 0 | 0 | 0 |
| Sibling Entry Number | | x | 6 | 3 | 2 | 5 | 4 | 7 | 1 |

RECORDING APPARATUS, FILE MANAGEMENT METHOD, PROGRAM FOR FILE MANAGEMENT METHOD, RECORDING MEDIUM HAVING PROGRAM FOR FILE MANAGEMENT METHOD RECORDED THEREON

BACKGROUND OF THE INVENTION

This invention relates to a recording apparatus, a file management method, a program for a file management method and a recording medium having a program for a file management method recorded thereon and can be applied typically to an optical disk apparatus.

In recent years, disk apparatus and the like have been proposed which use a randomly accessible recording medium having a large capacity such as an optical disk.

A method is disclosed, for example, in Japanese Patent Laid-Open No. 2001-84705 (hereinafter referred to as Patent Document 1) which uses such a disk apparatus as described above to improve the operability in operation of a large number of files. According to the method of the Patent Document 1, an index file for indexing a large number of files recorded on a recording medium is produced from the large number of files and recorded on the recording medium. The large number of files on the recording medium can be operated using the index file.

Japanese Patent Laid-Open No. 2002-278996 (hereinafter referred to as Patent Document 2) discloses a method which further improves the operability in operation of a large number of files recorded on a recording medium. According to the method of the Patent Document 2, an index file produced in such a manner as described above manages the files hierarchically.

An index file to which the method of the Patent Document 2 is applied is formed from a train of slots of extract information extracted from management object files and so forth. Each of the slots has reference information set therein which points to a corresponding slot of a higher hierarchy in a hierarchical structure based on settings of the user or the like separate from a hierarchical structure based on a file management system for the recording medium and further in a virtual hierarchical structure of favorites based on settings of the user or the like. Consequently, with the index file, a hierarchical structure can be represented by successively tracing different hierarchies from a lower hierarchy based on the reference information.

Incidentally, it is considered possible to use, as such reference information which defines a hierarchical structure as described above, not only such higher hierarchy reference information pointing to a slot of a higher hierarchy but also lower hierarchy reference information pointing to a slot of a lower hierarchy and same hierarchy reference information pointing to a slot of the same hierarchy. It is anticipated that, if such lower hierarchy reference information and same hierarchy reference information as just mentioned are additionally used, then the convenience in use can be further improved. In particular, if higher hierarchy reference information, lower hierarchy reference information and same hierarchy reference information are used, then it is possible to trace hierarchies to both of the higher hierarchy side and the lower hierarchy side and also it is possible to detect files and folders belonging to a folder simply and easily.

Further, if the three kinds of reference information described above are set such that the higher hierarchy reference information points to a folder while the lower hierarchy reference information points to a folder or a file and the reference information which indicates a relationship to another slot in the same hierarchy circulatively and successively points to one of the other slots of the same hierarchy, then each of the three kinds of reference information in each slot can be set so as to point to one slot. It is considered that this conveniently provides flexible dealing also where the number of files registered in one folder differs variously.

Also it is considered that, if, in management of extract information in a unit of such a slot as described above, a flag set in each slot is changed so as to set the extract information set in the slot as invalid extract information thereby set the slot as a free slot, then corresponding extract information can be deleted simply and easily in response to deletion or the like of a file or a folder and the management of the index file can be simplified.

However, where a flag is set so as to set a slot as a free slot or add a free slot in this manner and re-utilize the free slot, there is a problem that, if the reference information is set so as to raise the convenience in grasping of a hierarchical structure, then the processing of the reference information is rather complicated.

In particular, where a hierarchical structure is represented by such higher hierarchy, lower hierarchy and same hierarchy reference information described above, if some slot is set as a free slot, then it is necessary to vary the settings of the reference information for a file or folder corresponding to the slot because the relationship thereof to the other slots changes. However, it is necessary to change not only the reference information of the slot of the processing object but also the higher hierarchy, lower hierarchy and same hierarchy reference information which points to the slot of the processing object. Consequently, in this instance, it is necessary to re-set the reference information not only in the slot of the processing object but also in the other slots. Further, since the same hierarchy reference information is set so as to successively and circulatively point to another one of the slots in the same hierarchy, it is necessary to successively trace the reference information to detect preceding and following slots in the circulation and re-set the reference information of the slots.

On the other hand, in order to re-utilize a free slot to register extract information, it is necessary to execute a process reverse to that in setting of a free slot. A similar process is required also when a free slot is added and utilized.

SUMMARY OF THE INVENTION

It is an object of the present invention to provide a recording apparatus, a file management method, a program for a file management method and a recording medium having a program for a file management method recorded thereon wherein a hierarchical structure can be grasped readily and extract information can be registered or deleted simply and easily.

In order to attain the object described above, according to the present invention, functions of reference information pointing to slots of a higher hierarchy, a lower hierarchy and the same hierarchy are utilized effectively to register or delete extract information.

In particular, according to an aspect of the present invention, there is provided a recording apparatus, including means for recording desired files on a recording medium, means for updating an index file recorded on the recording medium in response to recording of any of the files, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, and means for setting the valid/invalid flag of a predetermined one of the slots which is in a state set to valid with the valid/invalid flag to invalid to set the slot as a free slot while settings of the higher hierarchy, lower hierarchy and same hierarchy reference information of the slot are maintained.

With the recording apparatus, desired files are recorded on a recording medium, and an index file recorded on the recording medium is updated in response to recording of any of the files. While settings of the higher hierarchy, lower hierarchy and same hierarchy reference information of a predetermined slot are maintained in a state wherein the predetermined slot is set to valid with the valid/invalid flag, the valid/invalid flag is set to invalid to set the slot as a free slot. Consequently, only if the valid/invalid flag is merely set in this manner, corresponding extract information can be deleted simply and easy such that the extract information can be registered into the original hierarchy. Consequently, the hierarchical structure can be grasped readily, and registration and deletion of the extract information are simplified.

According to another aspect of the present invention, there is provided a recording apparatus, including means for recording desired files on a recording medium, means for updating an index file recorded on the recording medium in response to recording of any of the files, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, means for setting the higher hierarchy, lower hierarchy and same hierarchy reference information so as to be inconsistent with regard to a predetermined one of the slots, means for setting the valid/invalid flag of the predetermined slot to valid and allocating the extract information to the predetermined slot, and means for registering the extract information into the index file.

With the recording apparatus, desired files are recorded on a recording medium, and an index file recorded on the recording medium is updated in response to recording of any of the files. The higher hierarchy, lower hierarchy and same hierarchy reference information is set so as to be inconsistent with regard to a predetermined slot, and the valid/invalid flag of the predetermined slot is set to valid and the extract information is allocated to the predetermined slot. Further, the extract information is registered into the index file. Therefore, even through the process with which the hierarchical structure cannot be grasped, the reference information can be set correctly to register the extract information. Consequently, the hierarchical structure can be grasped readily, and registration and deletion of the extract information are simplified.

According to a further aspect of the present invention, there is provided a recording apparatus, including means for recording desired files on a recording medium, means for updating an index file recorded on the recording medium in response to recording of any of the files, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, the higher hierarchical reference information being a parent entry number pointing to the slot corresponding to the closest folder to which a corresponding file or folder belongs, the lower hierarchy reference information being a child entry number which points, where the slot retains the extract information corresponding to a folder, to the slot corresponding to the closest folder or file which belongs to the folder, but indicates, where the slot retains the extract information corresponding to a file, a predetermined value, the same hierarchy reference information being a sibling entry number successively and circulatively pointing to another one of those slots which correspond to files and folders of the same hierarchy which belong to the corresponding folder or the folder same as that of the file, means for setting the valid/invalid flag of any of the slots to invalid to set the slot as a free slot, and means for setting the reference information of the free slot and the remaining free slots such that each of the sibling entry numbers of the free slot and the remaining free slots may successively and circulatively point to another one of the free slot and the remaining free slots.

With the recording apparatus, desired files are recorded on a recording medium, and an index file recorded on the recording medium is updated in response to recording of any of the files. The valid/invalid flag of any of the slots is set to invalid to set the slot as a free slot, and the reference information of the free slot and the remaining free slots is set such that each of the sibling entry numbers of the free slot and the remaining free slots may successively and circulatively point to another one of the free slot and the remaining free slots. Therefore, if a free slot is detected, then the sibling entry number set in the free slot can be successively traced to detect succeeding free slots. Consequently, the hierarchical structure can be grasped readily, and registration and deletion of the extract information are simplified.

According to a still further aspect of the present invention, there is provided a file management method wherein desired files are recorded on a recording medium and an index file recorded on the recording medium is updated in response to recording of any of the files, including, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, a step of setting the valid/invalid flag of a predetermined one of the slots which is in a state set to valid with the valid/invalid flag to invalid to set the slot as a free slot while settings of the higher hierarchy, lower hierarchy and same hierarchy reference information of the slot are maintained.

According to a yet further aspect of the present invention, there is provided a file management method wherein desired files are recorded on a recording medium and an index file recorded on the recording medium is updated in response to recording of any of the files, including the steps of, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, setting the higher hierarchy, lower hierarchy and same hierarchy reference information so as to be inconsistent with regard to a predetermined one of the slots, setting the valid/invalid flag of the predetermined slot to valid and allocating the extract information to the predetermined slot, and registering the extract information into the index file.

According to a yet further aspect of the present invention, there is provided a file management method wherein desired files are recorded on a recording medium and an index file recorded on the recording medium is updated in response to recording of any of the files, including the steps of, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, the higher hierarchical reference information being a parent entry number pointing to the slot corresponding to the closest folder to which a corresponding file or folder belongs, the lower hierarchy reference information being a child entry number which points, where the slot retains the extract information corresponding to a folder, to the slot corresponding to the closest folder or file which belongs to the folder, but indicates, where the slot retains the extract information corresponding to a file, a predetermined value, the same hierarchy reference information being a sibling entry number successively and circulatively pointing to another one of those slots which correspond to files and folders of the same hierarchy which belong to the corresponding folder or the folder same as that of the file, setting the valid/invalid flag of any of the slots to invalid to set the slot as a free slot, and setting the reference information of the free slot and the remaining free slots such that each of the sibling entry numbers of the free slot and the remaining free slots may successively and circulatively point to another one of the free slot and the remaining free slots.

According to a yet further aspect of the present invention, there is provided a program for a file management method for causing a computer to execute a predetermined processing procedure to record desired files on a recording medium and update an index file recorded on the recording medium in response to recording of any of the files, the processing procedure including, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, a step of setting the valid/invalid flag of a predetermined one of the slots which is in a state set to valid with the valid/invalid flag to invalid to set the slot as a free slot while settings of the higher hierarchy, lower hierarchy and same hierarchy reference information of the slot are maintained.

According to a yet further aspect of the present invention, there is provided a program for a file management method for causing a computer to execute a predetermined processing procedure to record desired files on a recording medium and update an index file recorded on the recording medium in response to recording of any of the files, the processing procedure including the steps of, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, setting the higher hierarchy, lower hierarchy and same hierarchy reference information so as to be inconsistent with regard to a predetermined one of the slots, setting the valid/invalid flag of the predetermined slot to valid and allocating the extract information to the predetermined slot, and registering the extract information into the index file.

According to a yet further aspect of the present invention, there is provided a program for a file management method for causing a computer to execute a predetermined processing procedure to record desired files on a recording medium and update an index file recorded on the recording medium in response to recording of any of the files, the processing procedure including the steps of, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, the higher hierarchical reference information being a parent entry number pointing to the slot corresponding to the closest folder to which a corresponding file or folder belongs, the lower hierarchy reference information being a child entry number which points, where the slot retains the extract information corresponding to a folder, to the slot corresponding to the closest folder or file which belongs to the folder, but indicates, where the slot retains the extract information corresponding to a file, a predetermined value, the same hierarchy reference information being a sibling entry number successively and circulatively pointing to another one of those slots which correspond to files and folders of the same hierarchy which belong to the corresponding folder or the folder same as that of the file, setting the valid/invalid flag of any of the slots to invalid to set the slot as a free slot, and setting the reference information of the free slot and the remaining free slots such that each of the sibling entry numbers of the free slot and the remaining free slots may successively and circulatively point to another one of the free slot and the remaining free slots.

According to a yet further aspect of the present invention, there is provided a recording medium on which a program for a file management method for causing a computer to execute a predetermined processing procedure to record desired files on a recording medium and update an index file recorded on the recording medium in response to recording of any of the files is recorded, the processing procedure including, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, a step of setting the valid/invalid flag of a predetermined one of the slots which is in a state set to valid with the valid/invalid flag to invalid to set the slot as a free slot while settings of the higher hierarchy, lower hierarchy and same hierarchy reference information of the slot are maintained.

According to a yet further aspect of the present invention, there is provided a recording medium on which a program for a file management method for causing a computer to execute a predetermined processing procedure to record desired files on a recording medium and update an index file recorded on the recording medium in response to recording of any of the files is recorded, the processing procedure including, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, setting the higher hierarchy, lower hierarchy and same hierarchy reference information so as to be inconsistent with regard to a predetermined one of the slots, setting the valid/invalid flag of the predetermined slot to valid and allocating the extract information to the predetermined slot, and registering the extract information into the index file.

According to a yet further aspect of the present invention, there is provided a recording medium on which a program for a file management method for causing a computer to execute a predetermined processing procedure to record desired files on a recording medium and update an index file recorded on the recording medium in response to recording of any of the files is recorded, the processing procedure including, the index file being formed from a train of slots of extract information of the files and a folder or folders, each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid, the higher hierarchical reference information being a parent entry number pointing to the slot corresponding to the closest folder to which a corresponding file or folder belongs, the lower hierarchy reference information being a child entry number which points, where the slot retains the extract information corresponding to a folder, to the slot corresponding to the closest folder or file which belongs to the folder, but indicates, where the slot retains the extract information corresponding to a file, a predetermined value, the reference information pointing to a relationship of each slot to the other slots of the same hierarchy being a sibling entry number successively and circulatively pointing to another one of those slots which correspond to files and folders of the same hierarchy which belong to the corresponding folder or the folder same as that of the file, setting the valid/invalid flag of any of the slots to invalid to set the slot as a free slot, and setting the reference information of the free slot and the remaining free slots such that each of the sibling entry numbers of the free slot and the remaining free slots may successively and circulatively point to another one of the free slot and the remaining free slots.

With the file management methods, the programs for a file management method and the recording media on which a program for a file management method is recorded, even where higher hierarchy, lower hierarchy and same hierarchy reference information is set, extract information can be registered or deleted simply and easily.

In summary, according to the present invention, since the functions of reference information pointing to slots of a higher hierarchy, a lower hierarchy and the same hierarchy are utilized effectively to register or delete extract information, the hierarchical structure can be grasped readily and the extract information can be registered or deleted simply and easily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a diagrammatic view illustrating an index file used in the optical disk apparatus of FIG. 1;

FIGS. 3A to 3D are diagrammatic views illustrating several entries of the index file of FIG. 2;

FIG. 6 is a flow chart illustrating a processing procedure for the process illustrated in FIGS. 4A and 4B;

FIG. 7 is a flow chart illustrating a processing procedure for the process illustrated in FIGS. 5A and 5B;

FIG. 8 is a diagrammatic view illustrating addition of a slot by an optical disk apparatus according to a second embodiment of the present invention;

FIGS. 9A and 9B are diagrammatic views illustrating a file structure compatible with the process of FIG. 8;

DETAILED DESCRIPTION OF THE PREFERRED EMBODIMENTS

1. First Embodiment 1-1. Configuration of the Optical Disk Apparatus

Figure 1:
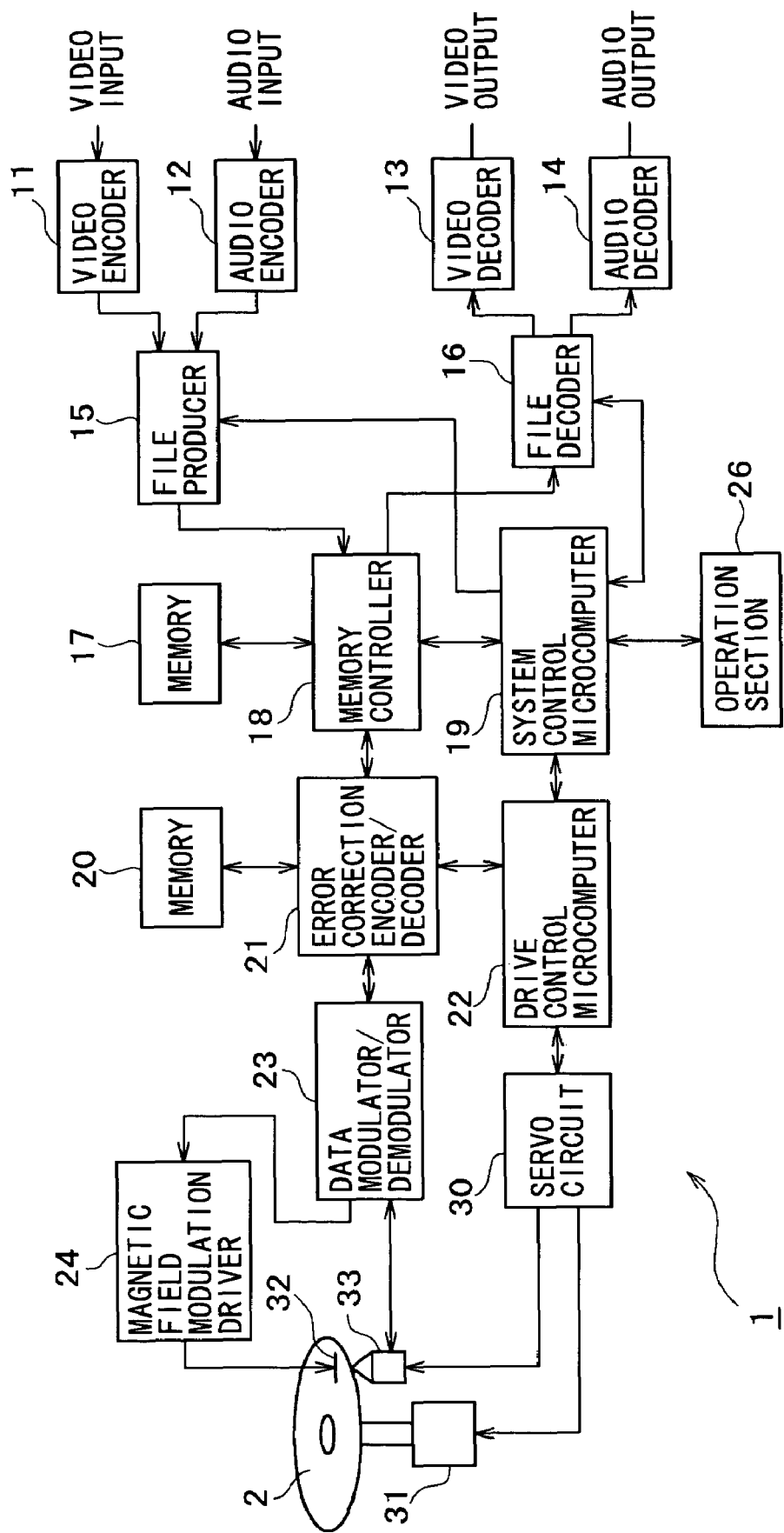
FIG. 1 is a block diagram showing an optical disk apparatus according to a first embodiment of the present invention.

FIG. 1 shows an optical disk apparatus according to a first embodiment of the present invention. The optical disk apparatus 1 acquires a video signal and an audio signal of an image pickup object by means of an image pickup section and a sound acquisition section not shown and records a result of image pickup of the video signal and audio signal on an optical disk 2. Further, the optical disk apparatus 1 reproduces the result of the image pickup recorded on the optical disk 2 and outputs it from a displaying section in the form of a liquid crystal display panel and a sound outputting section in the form of a speaker and further outputs it to external equipment. The optical disk apparatus 1 converts such a video signal and an audio signal of the image pickup result into streaming data in accordance with a format of the MPEG (Moving Picture Experts Group) and then records the streaming data in accordance with a predetermined file format on the optical disk 2. In the present embodiment, the QuickTime is applied as the predetermined file format just described.

In the optical disk apparatus 1, a video encoder 11 performs an analog/digital conversion process for a video signal of a result of image pickup to produce video data and then encodes the video data in accordance with the format of the MPEG. Consequently, an elementary stream of the video data is outputted from the video encoder 11.

An audio encoder 12 performs an analog/digital conversion process for an audio signal of a result of image pickup to produce audio data and then encodes the audio data in accordance with the format of the MPEG. Consequently, an elementary stream of the audio data is outputted from the audio encoder 12.

A file production section 15 performs, upon recording, a multiplexing process for the elementary streams outputted from the video encoder 11 and the audio encoder 12 and produces a QuickTime movie file under the control of a system controlling microcomputer 19.

A memory controller 18 changes over operation thereof under the control of the system controlling microcomputer 19. Upon recording, the memory controller 18 successively records and temporarily retains a data string of a QuickTime movie file outputted from the file production section 15 and various data outputted from the system controlling microcomputer 19 into a memory 17 and then outputs the retained data so as to be processed by a succeeding error correction encoding/decoding section 21. On the other hand, upon reproducing, the memory controller 18 temporarily retains output data from the error correction encoding/decoding section 21 and outputs the retained data to a file decoder 16 and the system controlling microcomputer 19.

The error correction encoding/decoding section 21 changes over operation thereof under the control of the system controlling microcomputer 19, and upon recording, temporarily records output data from the memory controller 18 into a memory 20 and adds an error correction code to the temporarily recorded data. Further, the error correction encoding/decoding section 21 reads out and outputs the data retained in the memory 20 in such a manner as just described in accordance with a predetermined order. Thereupon, the data are interleaved, and the interleaved data are outputted to a data modulation/demodulation section 23. On the other hand, upon reproduction, the error correction encoding/decoding section 21 temporarily records data outputted from the data modulation/demodulation section 23 into the memory 20 in accordance with a predetermined order and then outputs the data conversely to those upon recording. Thereupon, the error correction encoding/decoding section 21 performs a deinterleave process for the data outputted from the data modulation/demodulation section 23 and outputs the interleaved data to the memory controller 18. Further, at this time, the error correction encoding/decoding section 21 performs an error correction process with the error correction code added upon recording.

The data modulation/demodulation section 23 changes over operation thereof under the control of the system controlling microcomputer 19. Upon recording, the data modulation/demodulation section 23 converts output data from the error correction encoding/decoding section 21 into a serial data string and then performs a modulation process for the serial data string, and outputs the modulated serial data string to a magnetic field modulation driver 24 or an optical pickup 33. On the other hand, upon reproduction, the data modulation/demodulation section 23 reproduces a clock from a reproduction signal outputted from the optical pickup 33 and performs a binary identification process and a demodulation process for the reproduction signal with reference to the clock. Consequently, the data modulation/demodulation section 23 acquires reproduction data corresponding to the serial data string produced upon recording and outputs the reproduction data to the error correction encoding/decoding section 21.

Where a magneto-optical disk is used as the optical disk 2, upon recording, the magnetic field modulation driver 24 drives a magnetic field head 32 with an output signal of the data modulation/demodulation section 23 under the control of the system controlling microcomputer 19. Here, the magnetic field head 32 is held so as to face the optical pickup 33 with the optical disk 2 interposed therebetween, and applies a modulation magnetic field based on the output data from the data modulation/demodulation section 23 to an irradiation position of a laser beam of the optical pickup 33. Consequently, in the optical disk apparatus 1, where a magneto-optical disk is used as the optical disk 2, a Quick-Time movie file and so forth are recorded on the optical disk 2 using a thermomagnetic recording method.

The optical disk 2 is a disk type recording medium. In the present embodiment, as the optical disk 2, a rewritable optical disk such as a magneto-optical disk (MO), a phase change type disk or the like is used. A spindle motor 31 drives the optical disk 2 to rotate in accordance with conditions such as a constant linear velocity (CLV), a constant angular velocity (CAV), a zone constant linear velocity or the like suitable for the optical disk 2 under the control of a servo circuit 30.

The servo circuit 30 controls operation of the spindle motor 31 based on various signals outputted from the optical pickup 33 to perform a spindle controlling process. Further, the servo circuit 30 similarly controls the optical pickup 33 to perform a tracking control and a focusing control process, and further causes the optical pickup 33 and the magnetic field head 32 to perform seeking operation and executes a process such as a focus searching process.

A drive controlling microcomputer 22 controls operation of seeking and so forth of the servo circuit 30 in accordance with an instruction of the system controlling microcomputer 19.

The optical pickup 33 irradiates a laser beam upon the optical disk 2 and receives the reflected light by means of a predetermined light reception element, and then arithmetically operates a result of the light reception to produce various controlling signals. The optical pickup 33 outputs the controlling signals and further outputs a reproduction signal whose signal level varies in response to a pit string or a mark string formed on the optical disk 2. Further, the optical pickup 33 changes over operation thereof under the control of the system controlling microcomputer 19, and where the optical disk 2 is a magneto-optical disk, upon recording, the optical pickup 33 intermittently raises the luminous energy of the laser beam to be irradiated upon the optical disk 2. Consequently, in the optical disk apparatus 1, a QuickTime movie file or a like file is recorded onto the optical disk 2 by a pulse train method. On the other hand, where the optical disk 2 is a phase change type disk or the like, the optical pickup 33 raises the luminous energy of the laser beam to be irradiated upon the optical disk 2 from that upon reproduction to that upon writing. Consequently, a QuickTime movie file or the like is recorded on the optical disk 2 by applying a thermal recording method.

The optical disk apparatus 1 compresses a video signal and an audio signal of a result of image pickup by means of the video encoder 11 and the audio encoder 12 to individually convert them into elementary streams and then converts the elementary streams into a QuickTime movie file by means of the file production section 15. Data of the QuickTime movie file is sent successively through the memory controller 18, error correction encoding/decoding section 21 and data modulation/demodulation section 23 to the optical pickup 33. The data of the QuickTime movie file is recorded on the optical disk 2 by the optical pickup 33 or by the optical pickup 33 and the magnetic field head 32 together with data of an index file and so forth.

Further, the optical disk apparatus 1 processes a reproduction signal obtained by the optical pickup 33 by means of the data modulation/demodulation section 23 to obtain reproduction data and then processes the reproduction data by means of the error correction encoding/decoding section 21. Consequently, a QuickTime movie file, the index file and so forth recorded on the optical disk 2 can be reproduced, and the reproduced QuickTime movie file, index file and so forth are outputted from the memory controller 18.

The file decoder 16 receives data of the QuickTime movie file outputted from the memory controller 18, decompresses the data into elementary streams of video data and audio data, and outputs the elementary streams. A video decoder 13 decompresses the elementary stream of the video data and outputs the decompressed elementary stream to a display apparatus or external equipment not shown. An audio decoder 14 decompresses the elementary stream of the audio data outputted from the file decoder 16 and outputs the decompressed elementary stream to a sound outputting apparatus or external equipment not shown. Consequently, in the optical disk apparatus 1, a result of image pickup reproduced from the optical disk 2 can be monitored.

It is to be noted that the optical disk apparatus 1 includes an interface for allowing connection of an external apparatus such as a computer thereto. Consequently, the optical disk apparatus 1 can record output data of the external apparatus in place of data of an image pickup result on the optical disk 2 and reproduce a file recorded on the optical disk 2 so that the file can be processed by the external apparatus.

An operation section 26 comprises various operation elements of the optical disk apparatus 1 and a touch panel disposed on a liquid crystal display panel, and issues a notification of various operations by the user to the system controlling microcomputer 19.

The system controlling microcomputer 19 is a computer which controls operation of the entire optical disk apparatus 1. If loading of the optical disk 2 is detected through execution of a predetermined processing program recorded in a memory not shown, then the system controlling microcomputer 19 causes the optical pickup 33 to perform seeking operation to the innermost circumference and reproduce management information of a file managing system regarding the optical disk 2. Further, the system controlling microcomputer 19 acquires the reproduced management information from the memory controller 18 and stores it into a built-in memory. Consequently, the system controlling microcomputer 19 detects an address each file recorded on the optical disk 2 and a free region of the optical disk 2.

If the system controlling microcomputer 19 searches the management information acquired in this manner and detects that an index file is recorded on the optical disk 2, then it controls the optical pickup 33 to perform seeking operation to the recorded position of the index file and reproduce the index file. Then, the system controlling microcomputer 19 acquires the reproduced index file from the memory controller 18 and records and retains it into and in the built-in memory. Consequently, in the present embodiment, the overall operability is improved in processing of files recorded on the optical disk 2 through utilization of the index file. It is to be noted that the index file can be recorded on the innermost circumference side of a user area of the optical disk 2 to reduce the rise time.

The system controlling microcomputer 19 controls operation of the entire optical disk apparatus 1 using the index file in response to an operation of the user. In particular, the system controlling microcomputer 19 displays thumbnail images and so forth on a liquid crystal display panel for monitoring based on the index file to introduce contents of QuickTime movie files recorded on the optical disk 2. Then, the system controlling microcomputer 19 accepts selection of a file by the user from among the introduced QuickTime movie files and reproduces the file selected by the user based on corresponding management information.

On the other hand, if an instruction to record an image pickup result is issued by the user, then the system controlling microcomputer 19 detects a free region in accordance with the management information and causes the optical pickup 33 to perform seeking operation to the free region, and records successively obtained image pickup results onto the optical disk 2. Further, the system controlling microcomputer 19 updates the management information retained in the memory so as to correspond to records of QuickTime movie files by such recording of the image pickup results. Then, upon ejection of the optical disk 2 or the like, the system controlling microcomputer 19 updates the management information of the optical disk 2 in accordance with the updated management information. It is to be noted that the updating of the management information is executed by outputting the management information retained and updated in the memory to the error correction encoding/decoding section 21 through the memory controller 18.

In the processes described above, the system controlling microcomputer 19 outputs various kinds of information necessary for production of a QuickTime file to be used for recording to the file production section 15. Further, the system controlling microcomputer 19 acquires information necessary for production of an index file through the file production section 15. The system controlling microcomputer 19 uses the thus acquired information, information outputted to the file production section 15 and other necessary information to update the index file retained in the memory regarding a QuickTime movie file to be recorded newly on the optical disk 2. Then, the system controlling microcomputer 19 updates the index file recorded on the optical disk 2 with the updates index file retained in the memory in a similar manner as in the updating process of management information.

On the other hand, if an instruction to perform editing such as deletion of a file recorded or addition of a file to be recorded on the optical disk 2 or an index file is issued by the user, then the system controlling microcomputer 19 updates the index file and the management information retained in the memory in a similar manner as upon recording so as to cope with processing in the editing. Then, the system controlling microcomputer 19 updates the index file and the management information of the optical disk 2 with the index file and the management information retained in the memory. It is to be noted that, if the index file is not recorded although QuickTime movie files are recorded on the optical disk 2, the system controlling microcomputer 19 produces an index file in accordance with an instruction of the user. Then, the system controlling microcomputer 19 stores the index file into the memory and records the index file on the optical disk 2. In this process, the system controlling microcomputer 19 reproduces pertaining portions of QuickTime movie files from the optical disk 2 to acquire information necessary for production of an index file from the memory controller 18.

1-2. Index File

In the present embodiment, the index file is used to manage information necessary for reproduction by a file management system of the optical disk 2 such as an address of a recorded position, a file name and a file length of a file similarly to various files recorded on the optical disk 2 such as a QuickTime movie file. The index file includes information for introduction of contents of QuickTime movie files of an object of management recorded on the optical disk 2.

If a QuickTime movie file recorded on the optical disk 2 is selected based on the index file, then the optical disk apparatus 1 reproduces the selected file from the optical disk 2 based on the file management system. Consequently, even where a large number of QuickTime files are recorded on the optical disk 2, the optical disk apparatus 1 can select a desired file rapidly and accurately, and therefore, the operability can be improved as much.

In the present embodiment, the index file includes extract information extracted from information relating to QuickTime movie files and allocated to information which introduces contents of the QuickTime movie files. Therefore, the contents of the QuickTime movie files can be grasped simply and readily from the index file.

Referring to FIG. 2, the index file has a file structure same as that of a QuickTime movie file and includes an index data atom 71 which is a set of data of extract information and an index atom 70 which is a set of management data for managing the data set. Thus, the index file can be produced and processed using the file production section 15 which is a tool for production of a QuickTime movie file, and therefore, the optical disk apparatus 1 is simplified in configuration as much.

The extract information is extracted from part of management object files which introduce contents of the management object files in the index file. Therefore, although the extract information varies depending upon the types of the management object files, where the management object files are QuickTime movie files of video data and audio data as in the present embodiment, four kinds of data, that is, text data, thumbnail picture data and sound data corresponding to property data are applied to the extract data.

The property data is attribute information which represents an attribute of the disk title or a management object file, and extract information in the form of binary data set to the disk title or a management object file is allocated together with management information of the other extract information and so forth. The text data includes data representative of a character string of the disk title or the title of a management object file.

The thumbnail picture data comprises data of a still picture representative of the disk title or a management object file, and, for example, the top picture of a management object file is allocated to the thumbnail picture of the management object file. In contrast, to the thumbnail picture of the disk title or the like, a thumbnail picture, for example, of a specific management object file is allocated in accordance with selection of the user. It is to be noted that the thumbnail picture of each management object file may otherwise be set by selection of the user.

The sound data is audio data for a short period of time representative of contents of a management object file. To the sound data of a management object file, audio data for several seconds, typically for 5 seconds, for example, after reproduction of a corresponding file is started is allocated. In contrast, to the sound data of the disk title or the like, sound data, for example, of each specific management object file is allocated by selection of the user. It is to be noted that also the sound data of a management object file may otherwise be set by selection of the user.

Thus, in the optical disk apparatus 1, the system controlling microcomputer 19 acquires and decodes video data and audio data compressed by the file production section 15 and produces a sample picture from the video data through sampling of pixels of the video data. Meanwhile, with regard to the audio data, a required portion of it is cut out to produce sound data. Further, the system controlling microcomputer 19 produces title data from file information of each management object file stored in the file management system of the optical disk 2 in accordance with setting of the user. In contrast, the property data is produced based on the file information and so forth retained in the file management system by the system controlling microcomputer 19 in response to an operation of the user. It is to be noted that such thumbnail picture and sound data are compressed and allocated to the index data atom as occasion demands.

The index data atom 71 comprises actual data of the property and so forth grouped for each attribute and collected for the individual groups by atoms of a lower hierarchical layer. In the index data atom 71, headers PH, THH, TXH and SH are set at the tops of the individual groups as seen in FIGS. 3A to 3D, respectively, and for each group, following the header, actual data are successively allocated to a train of chunks which are slots of a QuickTime movie file. The chunks in the index data atom 71 have a fixed length, and extract information of one file or folder is allocated to one or a plurality of slots. Consequently, in the index data atom 71, an atom of extract information is formed from a train of slots following each of the headers PH to SH, and a property entry E4, a thumbnail picture entry E3, a text entry E2 and a sound entry E1 are formed individually in an atom structure and have extract information of the property data, thumbnail picture data, text data and sound data set therein, respectively. Where it is difficult to allocate extract information regarding a file or the like to one slot, extract information from a management object file or the like is allocated to a plurality of slots so that processing can be simplified by a data process with a fixed length.

The index atom 70 comprises track atoms 81, 82, 83 and 84 for property, thumbnail picture, text and sound data corresponding to the property entry E4, thumbnail image entry E3, text entry E2 and sound entry E1 of the index data atom 71, respectively, and a movie header atom 85 which supervises the track atoms 81 to 84. It is to be noted that, since only the property data is essentially required in the index data atom 71, only the movie header atom and the property track are essentially required in the index atom 70.

To the movie header atom 85, information relating to the entire index file is allocated similarly as in the case of a QuickTime movie file. In contrast, to each of the property track 81, text track 82, thumbnail track 83 and soundtrack 84, position information of corresponding actual data (relative positions (RBP: Relative Byte Position) and data length of start bytes of corresponding slots) is successively allocated in the form of a table.

Consequently, when the optical disk apparatus 1 performs a search for a desired file with reference to a thumbnail picture, for example, in accordance with an instruction of the user, it can acquire data of a corresponding slot from the index data atom 71 based on the thumbnail track 83 to successively acquire data of thumbnail pictures. Further, the optical disk apparatus 1 can detect a slot of a corresponding property from the property track 81 and process data of a thumbnail picture acquired in this manner and so forth.

1-3. Management with a Property Entry

The property entry E4 has registered therein extract information not only of files recorded on the optical disk 2 which are management object files but also existing folders, virtual folders and management object files virtually disposed in the virtual folders according to the file management system for the optical disk 2. It is to be noted that also the other entries E1 to E3 described hereinabove can have similarly registered therein existing folders, virtual folders and management object files virtually disposed in the virtual folders. Consequently, the index file can be used to manage the management object files in accordance with a hierarchical structure ready for the file management system for the optical disk 2 or in accordance with a hierarchical structure based on virtual folders including favorite files or the like set by the user.

Further, the property entry E4 is formed from slots having a fixed length similarly as in the other entries E1 to E3. Consequently, if extract information regarding the property cannot be allocated to one slot, a plurality of slots is allocated to one management object file or one folder. It is to be noted that, where a plurality of slots are allocated to a folder in the property entry E4 or the other entries E1 to E3, any other slot than the top slot is hereinafter referred to as extension slot.

Further, where a plurality of slots are set for one management object file or slot similarly in any of the other entries E1 to E3, also in the property entry E4, a plurality of slots are allocated so as to correspond to the slots of the entry E1, E2 or E3.

Consequently, for example, to a folder or the like in which none of the thumbnail picture entry E3, text entry E2 and sound entry E1 is set, extract information corresponding to one or a plurality of slots is allocated in accordance with the data amount of the extract information regarding the property. Meanwhile, to a file or a folder in which each of the thumbnail picture entry E3, text entry E2 and sound entry E1 is formed from one slot, extract information corresponding to one or a plurality of slots is allocated in accordance with the data amount of the extract information regarding the property similarly. On the other hand, to a file or a folder in which any of the thumbnail picture entry E3, text entry E2 and sound entry E1 is formed from a plurality of slots, a number of slots corresponding to the entry which includes the great number of slots among the thumbnail picture entry E3, text entry E2 and sound entry E1 are set even where the data amount of the extract information regarding the property is sufficiently small.

The property entry E4 has set in each slot thereof information representative of a relationship of the slot to corresponding slots of the thumbnail picture entry E3, text entry E2 and sound entry E1 as indicated by arrow marks in FIG. 3, and further has set in each slot thereof information indicating a relationship of the slot to an extension slot. Consequently, in the present embodiment, a plurality of slots in which extract information of one file or folder is registered can be managed in a unified manner as a single set with a property entry.

Figures 4A, 4B:
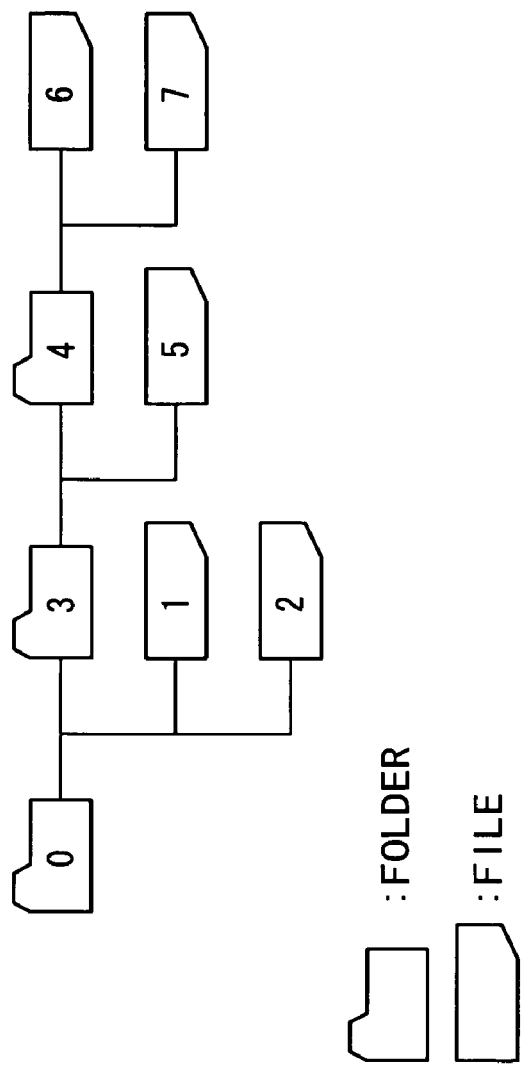
FIGS. 4A and 4B are diagrammatic views illustrating deletion of extract information by the optical disk apparatus of FIG. 1.

Further, in the property entry E4, reference information regarding such an existing hierarchical structure and a virtual hierarchical structure and information pointing to whether registered extract information is valid or invalid are set. In particular, as seen in FIGS. 4A and 4B, in the property entry E4, an entry number (Entry Number) for specifying each slot is set, and also, property entry flags (PE-Flags) which are a set of plural flags are set. The property entry E4 sets whether the slot is valid (0: Valid) or invalid (1: Invalid) depending upon a setting of a predetermined one of the property entry flags. Thus, by setting the predetermined flag such that the slot is invalid, the extract information set to the slot can be deleted (the flag is hereinafter referred to as valid/invalid flag). Similarly, another one of the property entry flags is used so as to make it possible to discriminate whether the slot corresponds to a folder (0: Folder) or a file (1: File).

Further, in the property entry, higher hierarchy reference information pointing to a slot of a higher hierarchy, lower hierarchy reference information pointing to a slot of a lower hierarchy and same hierarchy reference information pointing to another slot of the same hierarchy are set as reference information regarding a hierarchical structure to each slot. Here, to the higher hierarchy reference information, a parent entry number pointing to a slot corresponding to the closest folder to which a corresponding file or folder belongs is allocated. It is to be noted that, in FIGS. 4A and 4B and views illustrated similarly to FIGS. 4A and 4B, for simplified illustration, only property entries except extension slots are shown, and a slot number of a corresponding slot is set to and indicated in each of folders and files. However, where a slot of a property entry has an extension slot or a slot corresponding to another entry is present, a process for a slot of a property entry hereinafter described is executed collectively for such mutually relating slots.

FIG. 4A illustrates a hierarchical structure shown in FIG. 4B. In the hierarchical structure shown, files corresponding to slots having the entry numbers 6 and 7 exist in the lowest hierarchy and both belong to a folder corresponding to a slot having the entry number 4, and consequently, for the slots of the entry numbers 6 and 7, the parent entry number is set to 4. Meanwhile, a folder and a file corresponding to slots having the entry numbers 4 and 5, respectively, belong to a folder corresponding to a slot having the entry number 3, and consequently, for the slots of the entry numbers 4 and 5, the parent entry number is set to 3. Further, a folder which belongs to the slot of the entry number 3 and files which belong to slots having the entry numbers 1 and 2 belong to a root folder corresponding to a slot having the entry number 0, and therefore, for the slots of the entry numbers 1 and 3, the parent entry number is set to 0. It is to be noted that, for the slot of the root folder, a special value (indicated by a mark x) which does not specify any other slot is set.

To the lower hierarchy reference information, a child entry number (Child Entry Number) is set. Here, the child entry number is set such that, in a slot which corresponds to a folder, it points to the closest folder or file which belongs to the folder, but in a slot which corresponds to a file, it indicates a predetermined value. It is to be noted that, in FIG.

4A, the predetermined value is set to the value 0 which is a number pointing to a slot which does not actually exist in any lower hierarchy.

In particular, in the example of FIG. 4A, since the folder corresponding to the slot of the entry number 3 and the files corresponding to the slots of the entry numbers 1 and 2 are present immediately below the root folder corresponding to the slot of the entry number 0, in the slot of the entry number 0, the child entry number is set to 3. Further, since the folder corresponding to the slot of the entry number 4 and the file corresponding to the slot of the entry number 5 exist immediately below the folder corresponding to the slot of the entry number 3, in the slot of the entry number 3, the child entry number is set to 4. Meanwhile, since the files which correspond to the slots of the entry numbers 6 and 7 exist immediately below the folder corresponding to the slot of the entry number 4, in the slot of the entry number 4, the child entry number is set to 6. Further, since the files having the entry numbers 1, 2, 5, 6 and 7 do not have a lower hierarchy, in the corresponding slots, the child entry number is set to the value 0.

Further, in the property entry E4, a sibling entry number (Sibling Entry Number) is set as reference information of the same hierarchy. Here, the sibling entry number is set such that each of slots which correspond to files and folders which belong to the same hierarchy and the same folder successively and circulatively points to another one of the slots.

In particular, in FIGS. 4A and 4B, the files and folder which correspond to the slots of the slot numbers 1, 2 and 3 belong to the same hierarchy and the same root folder. Consequently, for the slots of the slot numbers 1, 2 and 3, the sibling entry number is set to 2, 3 and 1, respectively. Further, since the folder and file corresponding to the slots of the slot numbers 4 and 5 belong to the same hierarchy and belong to the same folder having the slot number 3, in the slots of the slot numbers 4 and 5, the sibling entry number is set to 5 and 4, respectively. Further, since the files corresponding to the slots having the slot numbers 6 and 7 belong to the same hierarchy and belong to the same folder of the slot number 4, in the slots of the slot numbers 6 and 7, the sibling entry number is set to 7 and 6, respectively.

From the foregoing, according to the property entry E4, the hierarchical structure can be grasped simply and readily from the higher hierarchy, lower hierarchy and same hierarchy reference information. Further, the reference information of the same hierarchy is set such that the corresponding slots have circulatively varying entry numbers. Consequently, even where the number of files which belong to one folder varies to various values, the hierarchical structure can be represented efficiently.

The system controlling microcomputer 19 executes a process of deletion or addition of a file, a process of varying a hierarchical structure, a process of editing the index file or any other required process and updates the index file so as to be compatible with the executed process. In the updating process of the index file, the system controlling microcomputer 19 registers or deletes extract information into or from the index file in accordance with addition or deletion of a file or a folder. The system controlling microcomputer 19 changes over between the registration and deletion processes of extract information depending upon whether or not a simplified process is selected by the user.

In particular, when the user does not select the simplified process, the system controlling microcomputer 19 detects, in response to deletion of a file and a folder by the user, a slot from which extract information is to be deleted from within the property entry E4 and detects the sibling entry number set to the detected slot. Then, the system controlling microcomputer 19 detects, based on the detected sibling entry number, the slot whose sibling entry number is set so as to point to the slot of the deletion object and the slot pointed to by the sibling entry number of the slot of the deletion object. In short, the system controlling microcomputer 19 detects a slot of a deletion object and slots preceding to and succeeding the slot of the deletion object in the circulative sibling entry numbers.

The system controlling microcomputer 19 updates the value of the sibling entry number which points to the slot of the deletion object set to the slot on the preceding side to the value which points to the succeeding slot. Further, in the slot of the deletion object, the sibling entry number is set to a value which does not point to any other slot. The system controlling microcomputer 19 thereby sets the sibling entry numbers so that the slot to be deleted is removed from the circulative ring of sibling entry numbers while the remaining slots have circulative sibling entry numbers.

Further, the system controlling microcomputer 19 detects a corresponding slot of a higher hierarchy from the parent entry number set to the slot of the deletion object. If the child entry number set to the slot of the higher hierarchy is set so as to point to the slot of the deletion object, then the system controlling microcomputer 19 sets the child entry number so as not to point to the slot of the deletion object. It is to be noted that, in this instance, the system controlling microcomputer 19 sets the child entry number so as not to point to the slot of the deletion object by setting the child entry number of the slot, for example, so as to point to the preceding side slot or the succeeding side slot detected by the process of sibling entry numbers described above. Furthermore, the system controlling microcomputer 19 sets the parent entry number set to the slot of the deletion object to a value which does not point to any other slot or another value which points to a special slot. It is to be noted that, in the present embodiment, the parent entry number is set to the value 0. The system controlling microcomputer 19 thereby updates the setting of the higher hierarchy reference information.

The system controlling microcomputer 19 further sets the valid/invalid flag to invalid to eliminate the relationship of the slot of the deletion object to any other slot and set the slot of the deletion object as a free slot thereby to delete the extract information. It is to be noted that, where the child entry number set to the slot of the deletion object indicates presence of a slot of a lower hierarchy which belongs to the slot and besides the setting of the flag indicates that the slot corresponds to a folder, if a confirmation from the user is obtained, then the system controlling microcomputer 19 sets the child entry number to the value 0 thereby to set the slot of the lower hierarchy as a free slot similarly.

On the other hand, if the user issues an instruction to add a file, then the system controlling microcomputer 19 executes processes for the reference information and the valid/invalid flag conversely to those upon deletion. In particular, the system controlling microcomputer 19 successively discriminates the setting of the valid/invalid flag to detect free slots. Further, the system controlling microcomputer 19 detects a slot corresponding to a folder to which the file is to be added and sets the parent entry number so as to point to the slot of the folder. Further, the system controlling microcomputer 19 detects, from the child entry number set to the slot of the folder, the entry number of another file or folder which belongs to the folder and detects the sibling entry number set to the slot of the entry number. The system controlling microcomputer 19 updates the detected sibling entry number of the slot to the entry number of the free slot and sets the sibling entry number set formerly to the detected slot to the free slot. Further, the system controlling microcomputer 19 registers extract information to the free slot and sets the valid/invalid flag to valid. It is to be noted that, when no free slot is found upon such addition of a file as described above, the system controlling microcomputer 19 adds a free slot to the property entry through a process similar to that for setting of a free slot upon deletion of extract information, and then registers the extract information into the added free slot.

Figures 5A, 5B:
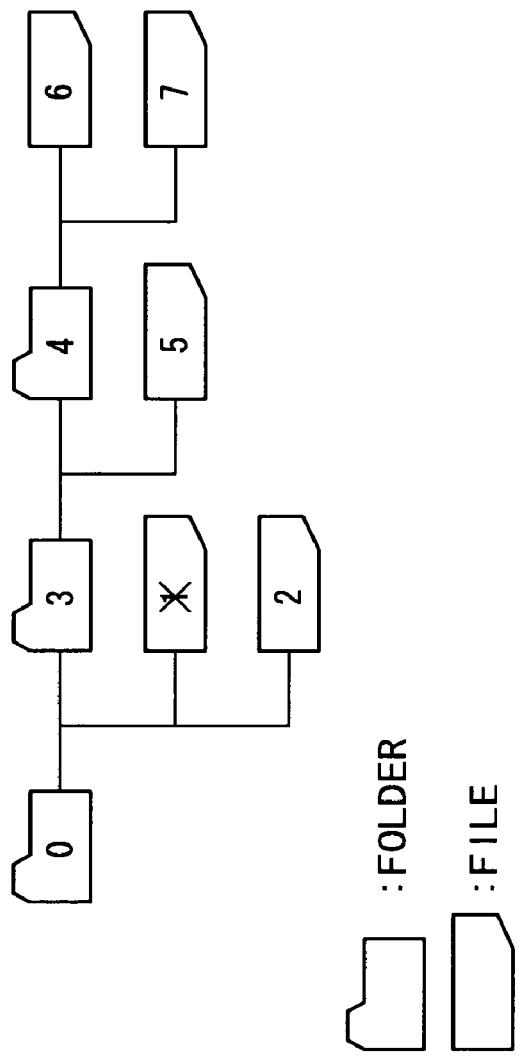
FIGS. 5A and 5B are diagrammatic views illustrating registration of extract information by the optical disk apparatus of FIG. 1.

On the other hand, if the simplified process is selected by the user, then the system controlling microcomputer 19 only sets the valid/invalid flag to invalid thereby to set the slot to be deleted as a free slot without varying the slot to be deleted and reference information pointing to the slot to be deleted at all as can be seen from FIGS. 5A and 5B in contrast with FIGS. 4A and 4B. Consequently, the system controlling microcomputer 19 expands the functions of the higher hierarchy, lower hierarchy and same hierarchy reference information which represent a hierarchical structure so that the reference information is utilized, with regard to a free slot, as information representative of the location prior to the setting of the free slot, but with regard to a slot which indicates a free slot, as information which specifies the slot set as a free slot in this manner. In short, in the example of FIG. 5A, the slot of the slot number 1 indicated by the mark x is set as a free slot in the file structure shown in FIG. 5B in contrast with FIG. 4B.

FIG. 6 illustrates a processing procedure for the simplified process by the system controlling microcomputer 19. Referring to FIG. 6, after the processing procedure is started, the system controlling microcomputer 19 advances its processing from step SP1 to step SP2, at which it displays a user interface in accordance with the index file. It is to be noted that the display includes, for example, a display of files and folders in a tree structure based on the property entry illustrated in FIG. 5B, a list of titles based on the title entry, a list of thumbnail pictures based on the thumbnail picture entry and so forth.

After the user interface is displayed in this manner, the system controlling microcomputer 19 advances the processing to step SP3, at which it accepts selection of a file to be deleted by the user through the user interface. Then at step SP4, the system controlling microcomputer 19 discriminates whether or not there exists some other file which refers to the file of the deletion object in an external file reference form.

If no such file is present, then the system controlling microcomputer 19 advances the processing from step SP4 to step SP5. At step SP5, the system controlling microcomputer 19 only sets the valid/invalid flag of the slot to be deleted to invalid without varying the reference information of the slot to be deleted and the reference information which points to the slot to be deleted at all thereby to set the slot as a free slot. Then, the processing returns to step SP2.

On the other hand, if an affirmative result is obtained at step SP4, then the system controlling microcomputer 19 advances the processing from step SP4 to step SP6, at which it displays a predetermined message to notify the user that, if the file indicated by the user is deleted, then a particular file or files having a reference relationship to the file to be deleted cannot be reproduced normally anymore. Then, if the user confirms the notification and issues an instruction to delete the files including the particular file or files having the reference relationship, then the system controlling microcomputer 19 deletes the files having the reference relationship and extract information of slots corresponding to the files. Thereafter, the system controlling microcomputer 19 advances the processing to step SP5. It is to be noted that, also for deletion of the extract information regarding the particular file or files having the reference relationship, only the valid/invalid flag is operated to set the slots as free slots without varying the reference information at all similarly as in the process at step SP5.

Consequently, in the present embodiment, even where information of a hierarchical structure regarding a higher hierarchy, a lower hierarchy and the same hierarchy is set, extract information can be deleted by a simple and easy process. Further, the information of the hierarchical structure maintained as it is in this manner can be utilized effectively upon registration of extract information to register the extract information simply and easily.

It is to be noted that, since setting of reference information is maintained as it is with regard to a free slot by such a simplified process as described above and therefore is contradictory to an actual setting, in a process of a search based on reference information such as, for example, a search for a file belonging to a predetermined folder with a sibling entry number, a result of the search is used for a process after it is filtered with the setting of the valid/invalid flag.

On the other hand, while the reference information is maintained as it is and the slot is set as a free slot in such a manner as described above, if an instruction to register extract information based on registration of a file or the like is issued from the user, then the system controlling microcomputer 19 detects a free slot belonging to a folder of the destination of registration of the file from the child entry number set in the slot of the folder and the sibling entry number of a slot specified by the child entry number. In particular, for example, in order to register a file into the root folder in the example shown in FIGS. 5A and 5B, the system controlling microcomputer 19 detects a slot corresponding to the folder of the entry number 3 from the child entry number of the slot (slot number 0) of the root folder. Then, the system controlling microcomputer 19 successively traces the sibling entry numbers of slots detected in this manner to detect a slot whose valid/invalid flag is set to invalid thereby to detect a free slot which originally belongs to the destination of registration.

The system controlling microcomputer 19 sets the valid/invalid flag of the detected free slot to valid and records the extract information into the slot whose valid/invalid flag has been set to valid in this manner. Consequently, the index file restores the state illustrated in FIGS. 4A and 4B from the state illustrated in FIGS. 5A and 5B. It is to be noted that, in this instance, extract information is registered also into slots and extension slots of the other entries associated with the slot of the property entry.

On the contrary, where such a free slot as described above does not exist, the system controlling microcomputer 19 adds a slot to the folder of the destination of registration and registers the extract information into the slot. It is to be noted that, in this instance, the system controlling microcomputer 19 sets reference information and so forth and registers extract information similarly as in the case wherein the simplified process described above is not set.

FIG. 7 illustrates a processing procedure for the registration of extract information by the system controlling microcomputer 19. Referring to FIG. 7, after the processing procedure is started, the system controlling microcomputer 19 advances its processing from step SP11 to step SP12, at which it receives a designation of a folder to which a file is to be added. Then at step SP13, the system controlling microcomputer 19 detects a free slot in such a manner as described above from within the designated folder. Then at step SP14, the system controlling microcomputer 19 discriminates whether or not a free slot is detected successfully. If an affirmative result is obtained, then the processing advances to step SP15, at which the system controlling microcomputer 19 registers information of various attributes into the free slot. Further at step SP16, the system controlling microcomputer 19 sets the valid/invalid flag to valid. Thereafter, the processing returns to step SP12.

On the other hand, if a negative result is obtained at step SP14, then the system controlling microcomputer 19 advances the processing to step SP17, at which it adds a free slot to the corresponding entry and registers information of various attributes into the free slot. Then at step SP19, the system controlling microcomputer 19 sets various kinds of reference information so that the free slot is compatible with the folder of the destination of registration, re-sets reference information of slots existing in the folder of the destination of registration and sets the valid/invalid flag to valid. Thereafter, the processing returns to step SP12.

Consequently, even where information of a hierarchical structure regarding a higher hierarchy, a lower hierarchy and the same hierarchy is set, the system controlling microcomputer 19 can effectively utilize information of a hierarchical structure maintained as it is upon registration of extract information to register extract information simply and easily.

1-4. Operation of the First Embodiment

In the optical disk apparatus 1 (FIG. 1) having such a configuration as described above, video data and audio data acquired by the image pickup system and the sound acquisition system are encoded by the video encoder 11 and the audio encoder 12, respectively, and then converted into a data stream of a QuickTime movie file by the file production section 15. The data stream is recorded on an optical disk 2 by a recording system formed from the memory controller 18, error correction encoding/decoding section 21, data modulation/demodulation section 23, magnetic field modulation driver 24 and optical pickup 33. Consequently, in the optical disk apparatus 1, a result of the image pickup is recorded as a QuickTime movie file on the optical disk 2. Further, output data of the system controlling microcomputer 19 is outputted to the recording system of the optical disk apparatus 1 so as to be compatible with the recording of the file of the optical disk 2. Consequently, management information of the file management system for the optical disk 2 is updated so as to be compatible with the recording of the QuickTime movie file.

The QuickTime movie file recorded in this manner is successively reproduced through the optical pickup 33, data modulation/demodulation section 23, error correction encoding/decoding section 21 and memory controller 18 based on the management information of the file management system and then decompresssed into elementary streams of video data and audio data by the file decoder 16. The elementary streams of video data and audio data are decoded by and outputted from the video decoder 13 and the audio decoder 14, respectively.

In the optical disk apparatus 1, upon such recording of a QuickTime movie file, data for thumbnail pictures and data for sound are acquired from the file production section 15 by the system controlling microcomputer 19, and data of a title is acquired by the system controlling microcomputer 19 through inputting of the user or the like before or after the recording of the file. Further, information of a file name and so forth regarding the file management system is acquired. Then, extract information of the QuickTime movie file to be recorded on the optical disk 2 is collected by the system controlling microcomputer 19. In the optical disk apparatus 1, an index file is produced with the extract information acquired in such a manner as described above in the memory built in the system controlling microcomputer 19 similarly to the management information regarding the file management system for the optical disk 2, and the index file is recorded on the optical disk 2 similarly to the QuickTime movie file. Further, the management information of the file management system is updated so as to be compatible with the recording of the index file.

Further, in the optical disk apparatus 1, the extract information is classified and grouped for each attribute, and an index data atom 71 (FIGS. 2 and 3A to 3D) is formed from a property entry, a text entry, a thumbnail entry and a sound entry each in the form of a train of slots for each attribute. Further, track atoms 81 to 84 are formed using reference information of the index data atom 71. Consequently, in the present embodiment, the index file can be utilized efficiently to detect a desired file simply and with certainty, and the operability can be improved as much.

While the thumbnail picture entry E3, text entry E2 and sound entry E1 in the index file produced in this manner have extract information allocated to one or a plurality of slots thereof having a fixed length, the property entry E4 to which attribute information of files and folders of an object of management has extract information allocated to one or a plurality of slots thereof having a fixed length similarly depending upon the number of slots corresponding to the slots of the thumbnail picture entry E3, text entry E2 and sound entry E1. Further, to each slot of the property entry E4, information representative of a relationship thereof to corresponding slots of the thumbnail picture entry E3, text entry E2 and sound entry E1 and information representative of a relationship thereof to an extension slot or slots are set. Consequently, in the present embodiment, a plurality of slots in which extract information of one file or folder is registered can be managed in a unified manner as a single set in a property entry.

In such a property entry E4 which makes a reference for management of various entries as described above, a parent entry number (Parent Entry Number) pointing to a folder of a higher hierarchy, a child entry number (Child Entry Number) pointing to a folder of a lower hierarchy and a sibling entry number (Sibling Entry Number) circulatively pointing to a slot belonging to the same hierarchy and the same folder are set as reference information of the higher hierarchy, lower hierarchy and same hierarchy in each of the slots other than an extension slot or slots (FIGS. 4A, 4B, 5A and 5B). Consequently, when the higher hierarchy side is searched from the lower hierarchy or when the lower hierarchy side is searched from the higher hierarchy or else when a file or the like of the same hierarchy which belongs to the same folder is searched, the search can be performed simply and with certainty, and the hierarchical structure can be grasped simply and readily as much.

Actually, while the optical disk 2 has a very great capacity, a great number of files whose capacity is comparatively small are produced as a result of image pickup, and consequently, a very great number of files are recorded and retained on the recording medium. In such an instance, for example, if a sibling entry number is not set, then in order to search for a file which belongs to a folder, all slots which form a property entry must be searched, and therefore, a very long period of time is required for the search. In contrast, where a sibling entry number is set as in the present embodiment, then a file which belongs to a desired folder can be detected simply and with certainty by a search which involves tracing of such sibling entry numbers. Consequently, a process for a search and so forth for grasping a hierarchical structure can simplified as much.

Where reference information of a higher hierarchy, a lower hierarchy and the same hierarchy is set in this manner, if the simplified process is not designated by the user, then in the present embodiment, the valid/invalid flag is set to invalid in a corresponding slot of the property entry E4. Further, reference information of the slot and any slot associated with the slot is updated so as to be compatible with the setting to invalid, and consequently, the slot is set as a free slot and the extract information is deleted. Further, in the slot set as a free slot in this manner, the valid/invalid flag is set to valid, and reference information of the slot and a slot of the destination of registration associated with the slot is updated so as to be compatible with the setting to valid of the valid/invalid flag. Consequently, the extract information is registered into the free slot.

However, in such processes for registration and deletion of extract information as described above, not only of the slot to be registered or deleted but also other slots having a relationship to the slot with their reference information must be re-set, and time is required for the processing as much.

Therefore, in the present embodiment, if the user selects the simplified process, then only the valid/invalid flag of a slot for deletion is set to invalid without varying reference information thereby to expand the function of the reference information such that the reference information of a free slot represents a location before the setting of the free slot whereas the reference information of a slot which indicates the free slot specifies the slot set as a free slot in this manner thereby to set the slot as a free slot (FIGS. 5A, 5B and 6). Consequently, in the present embodiment, a hierarchical structure can be grasped readily based on reference information of a higher hierarchy, a lower hierarchy and the same hierarchy so that extract information can be deleted by a simple process. Further, upon registration of extract information, the information of the hierarchical structure maintained as it is in this manner can be utilized effectively to register the extract information simply and readily.

Further, even where a slot is set as a free slot depending upon the setting of the valid/invalid flag without varying the reference information in this manner, by processing a result of a search based on the reference information after it is filtered with the setting of the valid/invalid flag or by searching for a free slot with reference to the setting of the valid/invalid flag, slots set in the index file can be recognized correctly to grasp the hierarchical structure similarly as in an alternative case wherein the reference information is re-set to set a free slot. Consequently, the hierarchical structure can be grasped readily without degrading the original function of the reference information at all.

In contrast, where a file is registered through the simplified process, in the present embodiment, a free slot wherein the reference information remains set such that the slot belongs to a folder of the destination of registration is detected based on the reference information. If such a free slot as just described is detected, then the valid/invalid flag is set to valid without varying the reference information of the slot and the reference information of any other slot which is associated with the slot at all, and extract information is registered (FIGS. 4A, 4B, 5A, 5B and 7). On the other hand, if such a free slot as described above is not detected successfully, then a slot is added and extract information is registered.

Consequently, in the present embodiment, reference information of a hierarchical structure maintained as it is can be utilized effectively to register extract information simply and readily.

1-5. Advantages of the First Embodiment

With the configuration described above, since reference information of a higher hierarchy, a lower hierarchy and the same hierarchy is maintained as it is and extract information is deleted only with a setting of a valid/invalid flag to form a free slot, a hierarchical structure can be grasped readily and extract information can be deleted by a simple and easy process.

Further, where the information of the hierarchical structure maintained as it is in this manner is utilized effectively upon registration of extract information to register extract information in accordance with the setting of the valid/invalid flag, the hierarchical structure can be grasped readily and the extract information can be registered simply and easily.

Furthermore, the reference information points, with regard to a slot which retains a parent entry number pointing to a slot corresponding to the closest folder to which a corresponding file or folder belongs, to the slot corresponding to the closest folder or file which belongs to the folder, but indicates, with regard to a slot which retains extract information corresponding to the folder, a child entry number set to a predetermined value and a sibling entry number successively and circulatively pointing to another slot from among slots corresponding to files and slots of the same hierarchy which belong to the same folder as the corresponding folder or file. Therefore, the hierarchical structure can be grasped simply and easily, and the extract information can be registered or deleted simply and easily.

2. Second Embodiment

In the present embodiment, extract information is registered by a simpler and easier process than that in the first embodiment. It is to be noted that, in the following description, the configuration described above in connection with the first embodiment with reference to FIGS. 1 to 7 is applied suitably, and overlapping description of the common configuration is omitted herein to avoid redundancy.

In the present embodiment, the system controlling microcomputer 19 executes such a process as a search while reference information of a higher hierarchy, a lower hierarchy and the same hierarchy described above is ignored such that the hierarchical structure based on an index file cannot be recognized, but such a process as a search can be executed through a process simplified as much. Consequently, in the present embodiment, for example, when an optical disk 2 on which an index file described hereinabove in connection with the first embodiment is recorded is loaded, if the user issues an instruction to display files recorded on the optical disk 2 in a table, then slots which are set to valid merely from their valid/invalid flags are detected. Then, file names, thumbnail pictures and so forth are displayed in a table based on information of extension slots and so forth of the detected slots.

Further, if the user issues an instruction to delete a file on such a table display as described above, then the system controlling microcomputer 19 performs the simplified process described hereinabove in connection with the first embodiment to delete the extract information while maintaining the reference information as it is. Consequently, in the present embodiment, extract information can be deleted to form a free slot by a simple and easy process.

On the other hand, if the user issues an instruction to register a file, then the system controlling microcomputer 19 detects a free slot deleted in such a manner as described above as indicated by the entry number 8 in FIG. 8 based on the valid/invalid flag. If such a free slot as just described cannot be detected, then the system controlling microcomputer 19 adds a slot and registers the extract information into the slot while all of the parent entry number, child entry number and sibling entry number are set to the value 0. It is to be noted that, in the example of FIG. 8, on an optical disk 2 on which an index file and corresponding files are recorded by the optical disk apparatus according to the first embodiment, the file of the entry number 8 is recorded by the optical disk apparatus according to the present embodiment.

In contrast, in management based on the file management system for the optical disk 2, for example, the file is allocated to a predetermined folder to whose folder name the date of the registration of the file is set. Consequently, in the present embodiment, the parent entry number and the child entry number are set so as to point to the same slot, and the sibling entry number is set so as to point to the root folder which cannot belong to the same hierarchy or the same folder. Further, the reference information is set such that it is different from the hierarchical structure regarding the corresponding file so that the reference information may be contradictory, and in this state, the valid/invalid flag is set to valid and the extract information is allocated and registered into the index file.

However, in the optical disk apparatus of the present embodiment, since a process such as a search process is executed ignoring the reference information of the higher hierarchy, the lower hierarchy and the same hierarchy, the extract information regarding the slot registered in this manner is recognized correctly similarly to the other extract information to which reference information is set correctly (the extract information registered in the slots of the slot numbers 0 to 7).

In contrast, the optical disk apparatus which recognizes the hierarchical structure described above in connection with the first embodiment grasps the file corresponding to the slot registered in such a manner as described above as an independent file which does not belong to any folder as seen in FIG. 9A where the hierarchical structure is grasped with reference to the child entry numbers and the sibling entry numbers set to the slots, but as a file which belongs to the root folder as seen in FIG. 9B where the hierarchical structure is grasped with reference to the parent entry numbers set to the slots. Consequently, also the optical disk apparatus having such a configuration as described above can grasp the hierarchical structure without giving rise to any trouble with the process and can execute, when necessary, a restoration process for eliminating the contradiction of the reference information and further perform a process with the hierarchical structure grasped from one of the two different kinds of reference information to similarly process the index file recorded by the optical disk apparatus having such a configuration as described above.

Figure 10:
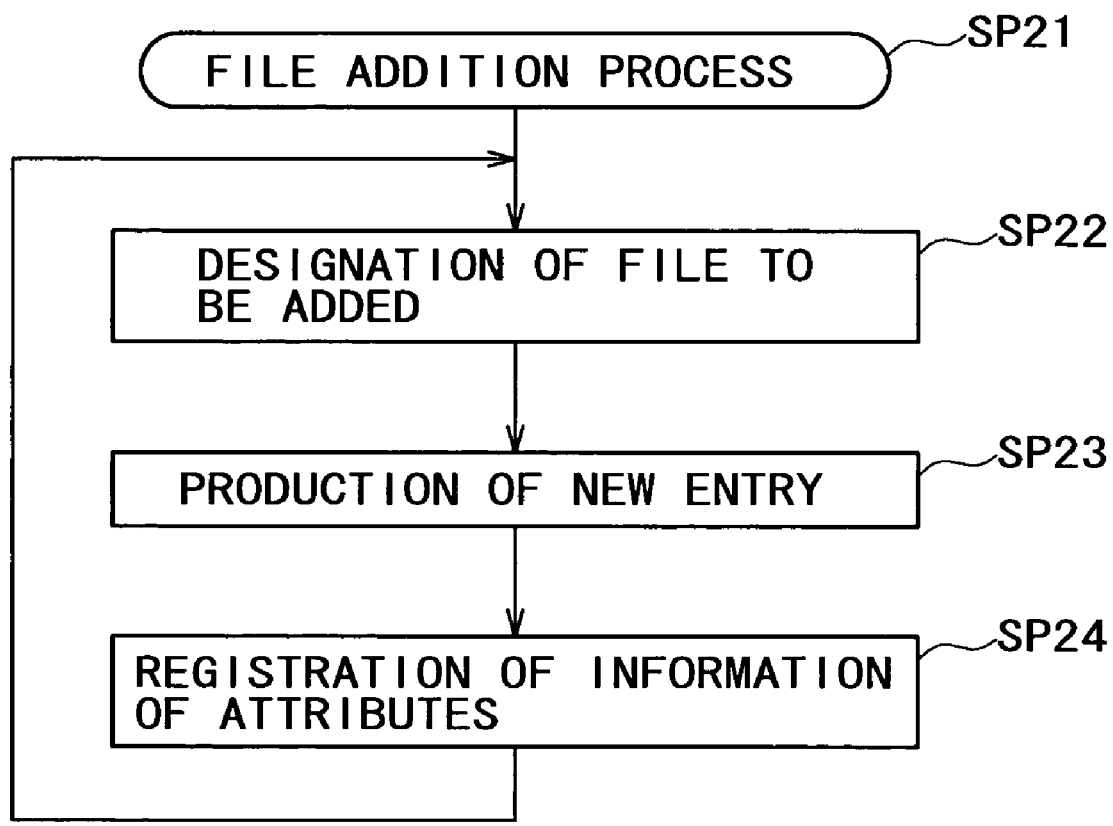
FIG. 10 is a flow chart illustrating a processing procedure for the process of FIG. 8.

FIG. 10 illustrates a processing procedure for the registration of a file by the system controlling microcomputer 19. Referring to FIG. 10, after the processing procedure is started, the system controlling microcomputer 19 advances its processing from step SP21 to step SP22, at which it accepts a designation of a file to be added. Then at step SP23, the system controlling microcomputer 19 sets the reference information and the valid/invalid flag described above to the free slot, and then at step SP24, the system controlling microcomputer 19 registers the extract information into the slot. Thereafter, the processing returns to step SP22.

Consequently, where the extract information is set so as to be contradictory and the thus contradictory extract information is registered as in the present embodiment, even where it is made possible to simply and easily grasp a hierarchical structure from reference information of a higher hierarchy, a lower hierarchy and the same hierarchy, the extract information can be registered simply and easily.

More particular, reference information can be set so as to be contradictory such that reference information is different from a hierarchical structure regarding a corresponding file, or reference information of a higher hierarchy and reference information of a lower hierarchy are set so as to point to the same slot, or else reference information of the same hierarchy points to a slot which does not exist in the same hierarchy. Consequently, the extract information can be registered simply and easily.

3. Third Embodiment

In the present embodiment, a slot of extract information registered using the technique described hereinabove in connection with the second embodiment is detected and restored. It is to be noted that the optical disk apparatus of the present embodiment has a configuration same as that of the optical disk apparatus according to the first embodiment except that the restoration process is involved. Therefore, in the following description, the description of the configuration of the optical disk apparatus 1 according to the first embodiment is applied.

In the optical disk apparatus of the present embodiment, the system controlling microcomputer 19 detects a slot in which reference information described above is set so as to be contradictory as described above in connection with the second embodiment and sets the slot as a restoration object. Consequently, in the present embodiment, a processing object can be detected simply and readily.

More particularly, in the present embodiment, taking notice of the point that reference information of the same hierarchy is contradictory from among the points that a setting by reference information is different from a hierarchical structure regarding a corresponding file, that reference information of a higher hierarchy and reference information of a lower hierarchy are contradictory to each other and that reference information of the same hierarchy is contradictory, a slot whose sibling entry number is set to the value 0 is detected and set as a restoration object.

Further, files corresponding to such slots of a restoration object are displayed collectively in a table, and the file management system for the optical disk 2 is rewritten and the reference information of the slot is updated in accordance with an instruction of the user on the display thereby to eliminate the contradiction of the reference information to execute a restoration process.

Figures 11A, 11B:
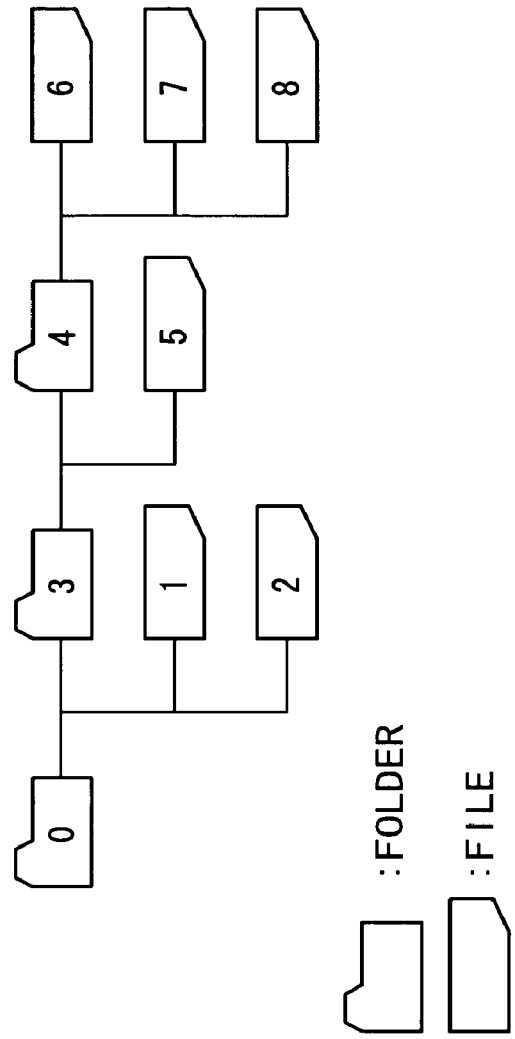
FIGS. 11A and 11B are diagrammatic view illustrating a restoration process by an optical disk apparatus according to a third embodiment of the present invention.

In particular, as seen from FIG. 8 and from FIGS. 11A and 11B in contrast with FIG. 8, since the parent entry number, child entry number and sibling entry number of the slot of the entry number 8 described hereinabove in connection with the second embodiment are set to the value 0 and the valid/invalid flag of the slot is set to the value 0, in the present embodiment, all slots are searched to detect the slot whose sibling entry number is the value 0. Consequently, in the example illustrated in FIG. 8, the slot of the entry number 8 is detected. Further, for example, if the user issues an instruction to register the slot of the entry number 8 into the folder of the entry number 4, then the parent entry number is set to the value 4 while the child entry number maintains the value 0. Further, regarding the sibling entry number, the value is set so that it forms a circulation among the slot of the entry number 8 and the slots of the entry numbers 6 and 7 registered already in the folder of the entry number 4. Further, the records of the file management system for the optical disk 2 are updated so as to be compatible with the registration into the folder of the entry number 3.

Figure 12:
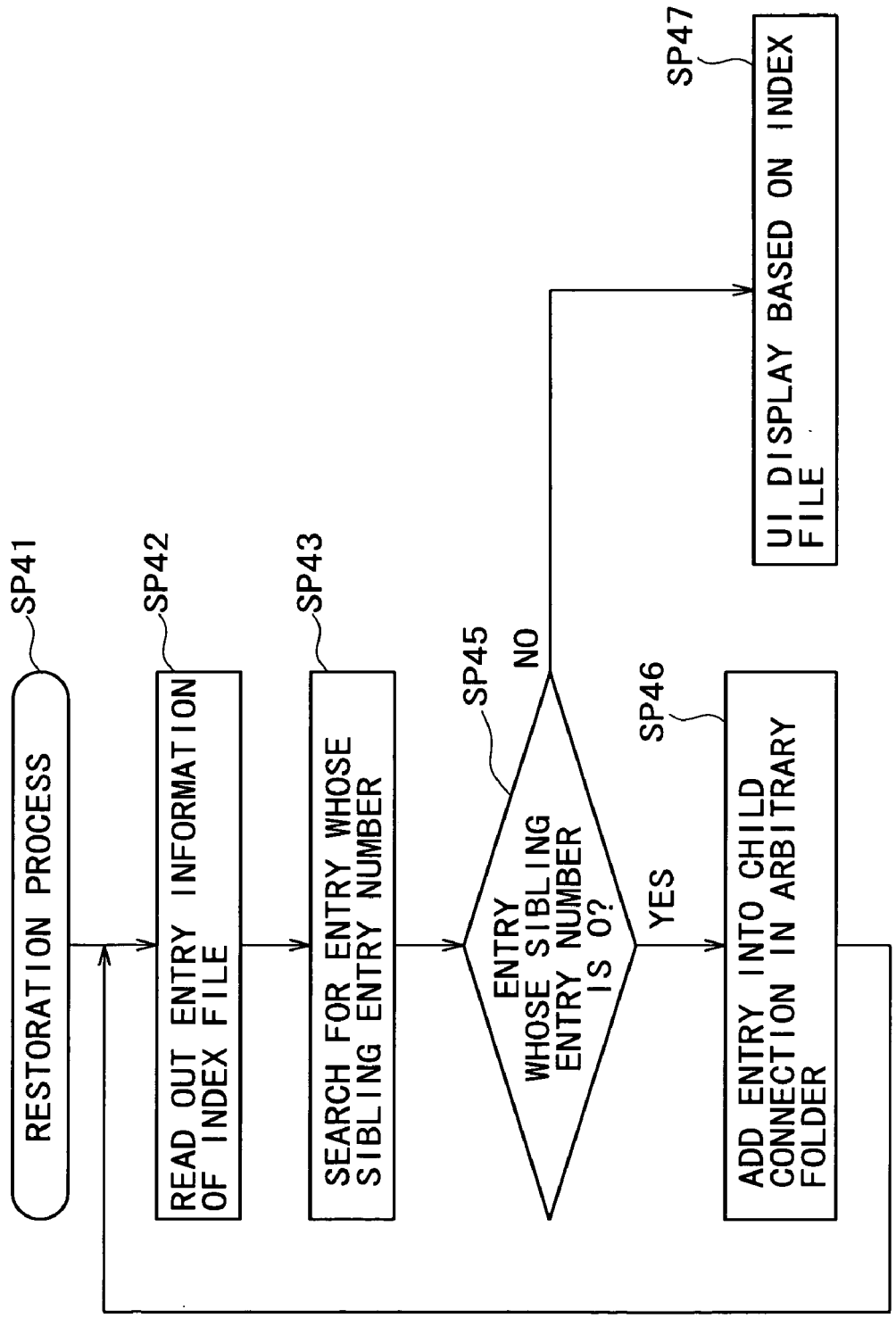
FIG. 12 is a flow chart illustrating a processing procedure for the process of FIG. 11.

FIG. 12 illustrates a processing procedure for the restoration process by the system controlling microcomputer 19. Referring to FIG. 12, after an instruction for restoration is issued by the user, the system controlling microcomputer 19 advances its processing from step SP41 to step SP42, at which it reads out the index file from the optical disk 2 to acquire information of the slots. Then at step SP43, the system controlling microcomputer 19 searches the acquired information of the slots to detect a slot whose sibling entry number is set to the value 0. Then at step SP45, the system controlling microcomputer 19 discriminates whether or not a slot of the type described is detected successfully. If an affirmative result is obtained, then the system controlling microcomputer 19 advances the processing to step SP46, at which it sets the reference information in such a manner as described hereinabove with reference to FIGS. 11A and 11B and registers the slot into an arbitrary folder indicated by the user. Thereafter, the processing advances to step SP43.

On the other hand, if a negative result is obtained at step SP45, then the system controlling microcomputer 19 advances the processing to step SP47, at which, since the restoration is completed, the system controlling microcomputer 19 displays the file names and so forth in the completed tree structure.

With the configuration of the present embodiment, slots to which contradictory reference information of a higher hierarchy, a lower hierarchy or the same hierarchy is set is detected, and files corresponding to the thus detected slots are displayed collectively. Consequently, for example, the files registered in the index file can be detected and provided to the user ignoring the hierarchical structure.

Further, if the reference information is set so that such slots belong to a predetermined folder indicated by the user, then the reference information can be restored such that the files registered in the index file ignoring the hierarchical structure can be managed in accordance with the hierarchical structure.

4. Fourth Embodiment

In the present embodiment, in place of the point that reference information of the same hierarchy described hereinabove in connection with the third embodiment is contradictory, the point that the reference information of a higher hierarchy and the reference information of a lower hierarchy are contradictory to each other is utilized to detect a registered slot ignoring the hierarchical structure and perform a restoration process for the slot.

In particular, in the present embodiment, those slots to which both of the child entry number and the parent entry number are set to the value 0 are detected and set as an object of restoration, and a restoration process is executed for the restoration object slots. Further, the restoration process for such slots is performed such that they belong not to a folder designated by the user but to a folder set in advance or a folder corresponding to the file management system for the optical disk 2.

Even where the point that reference information of a higher hierarchy and reference information of a lower hierarchy are contradictory to each other is utilized to detect a registered slot ignoring the hierarchical structure and perform a restoration process for the detected slot as in the present embodiment, similar advantages to those achieved by the third embodiment can be achieved.

5. Fifth Embodiment

Figures 13A, 13B, 13C:
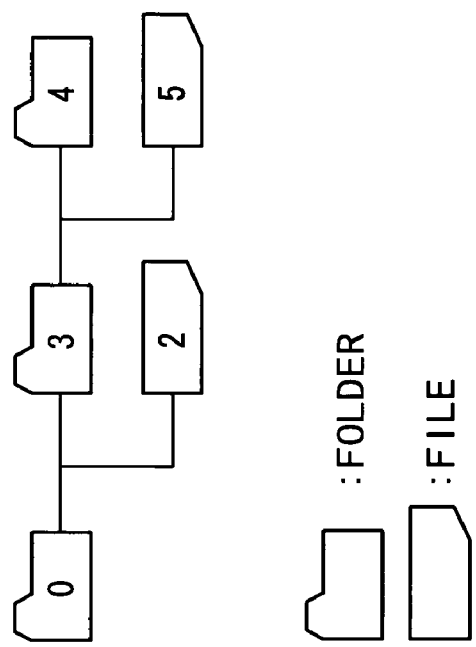
FIGS. 13A, 13B and 13C are diagrammatic views illustrating deletion of extract information by an optical disk apparatus according a fifth embodiment of the present invention.

In the present embodiment, also free slots have sibling entry numbers set so as to be circulative among them. In particular, for example, when extract information registered in the slots of the entry numbers 1, 6 and 7 is to be deleted as seen in FIG. 13A, the following setting is performed first for the slot of the entry number 1. In particular, the parent entry number and the child entry number of the entry are set to the value 0 and the parent entry number, child entry number and sibling entry number of each of the other slots are set so that any other slot may not be pointed to from the entry and the entry may not be pointed to by any other slot. Further, for the other slots, the sibling entry numbers are re-set so that they exhibit a circulation. On the other hand, for a slot to be deleted, the entry number of the slot itself is set as the sibling entry number, and the valid/invalid flag is set to invalid.

Where another slot is to be deleted continuously after one slot is deleted in this manner, the parent entry number and the child entry number of the second slot are set to the value 0, and the parent entry number, child entry number and sibling entry number are re-set to the other slots. Further, in the slot to be deleted, the sibling entry number is set so as to point to a slot set already as a free slot. Further, for each of slots set already as free slots, the sibling entry number is set so as to point to the slot to be deleted and the valid/invalid flag is set to invalid. Consequently, the sibling entry numbers are set so as to exhibit a circulation also among the free slots.

Figure 14:
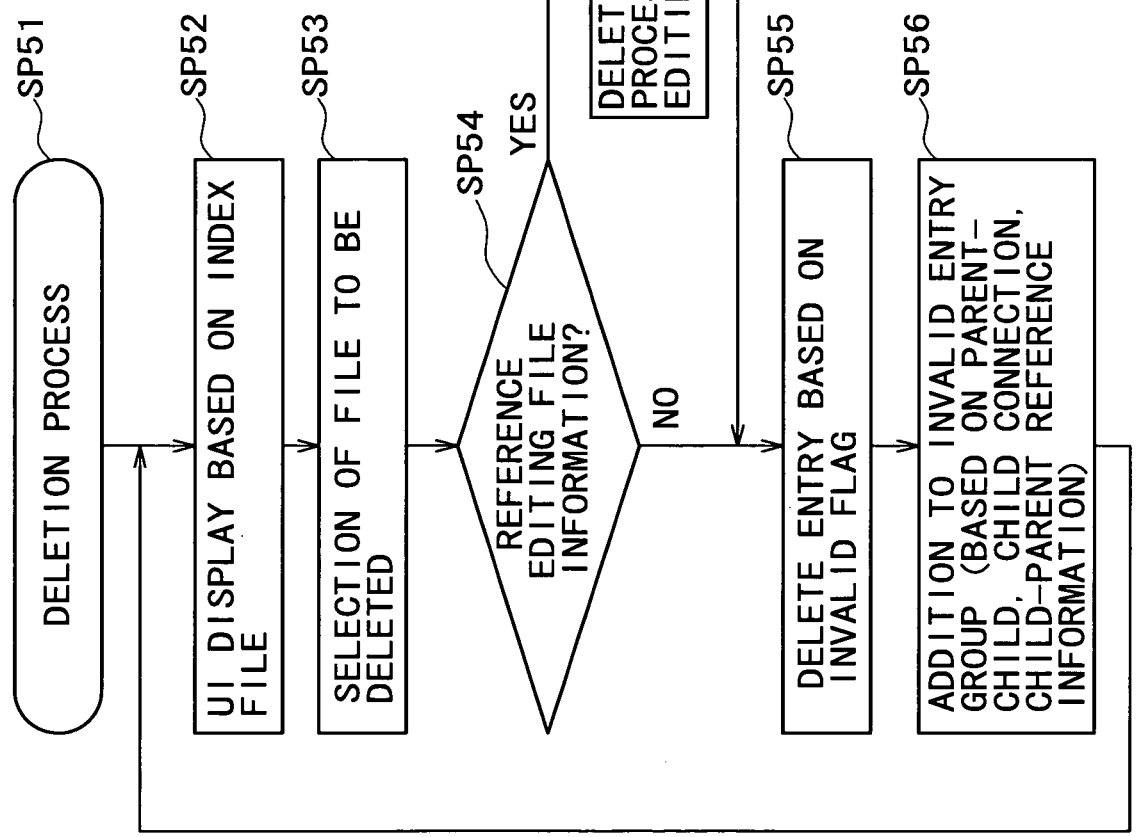
FIG. 14 is a flow chart illustrating a processing procedure for the process of FIGS. 13A, 13B and 13C.

FIG. 14 illustrates a processing procedure for the deletion process by the system controlling microcomputer 19. Referring to FIG. 14, after the processing procedure illustrated is started, the system controlling microcomputer 19 advances its processing from step SP51 to step SP52, at which it displays a user interface based on the index file. Then at step SP53, the system controlling microcomputer 19 accepts selection of a file to be deleted based on selection of the user through the user interface. Then at step SP54, the system controlling microcomputer 19 discriminates whether or not there exists another file which refers to the file of the deletion object in accordance with an external file reference form.

If a file which refers to the file of the deletion object does not exist, then the system controlling microcomputer 19 advances the processing from step SP54 to step SP55, at which it sets the valid/invalid flag for the slot to be deleted to invalid thereby to set the slot as a free slot. Then at step SP56, the system controlling microcomputer 19 sets such reference information as described hereinabove. Thereafter, the processing returns to step SP52.

On the other hand, if an affirmative result is obtained at step SP54, then the system controlling microcomputer 19 advances the processing from step SP54 to step SP57, at which it displays a predetermined message to notify the user that, if the indicated file is deleted, then a particular file having a reference relationship to the indicated file cannot be reproduced normally any more. Further, if the user confirms the notification and issues an instruction to delete the files including the particular file having the reference relationship, then the system controlling microcomputer 19 deletes the file having the reference relationship and the extract information of the slot corresponding to the file. Thereafter, the processing advances to step SP55. It is to be noted that also the deletion of the extract information regarding the particular file having the reference relationship is executed similarly to the process at step SP55.

When free slots are set in this manner and extract information is to be registered into the free slots, after the system controlling microcomputer 19 registers extract information into one of the free slots, it detects a succeeding free slot from the sibling entry number set in the free slot. Consequently, in the present embodiment, the processing of detecting a free slot is simplified.

Figure 15:
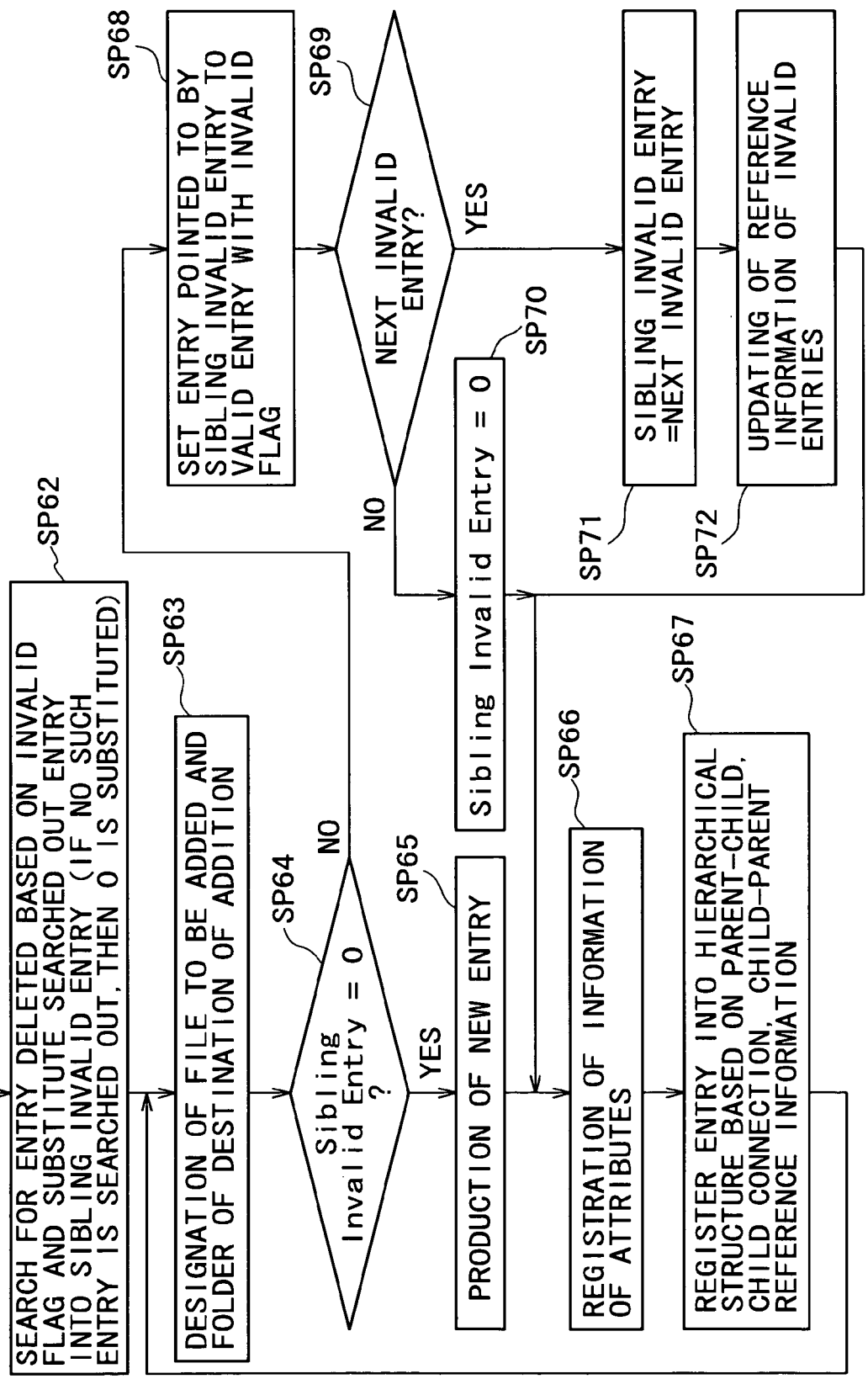
FIG. 15 is a flow chart illustrating a processing procedure for a registration process of extract information corresponding to the process for deletion of FIG. 13.

FIG. 15 illustrates a processing procedure for the extract information registration process by the system controlling microcomputer 19. Referring to FIG. 15, after the processing procedure illustrated is started, the system controlling microcomputer 19 advances its processing from step SP61 to step SP62, at which it detects a property entry and detects a free slot and then registers the entry number of the free slot into a variable of a sibling entry number. It is to be noted that, if no free slot is detected successfully in this instance, then the value 0 is registered into the variable.

Then, the system controlling microcomputer 19 advances the processing to step SP63, at which it accepts designation of a folder to which the file is to be added. Then at step SP64, the system controlling microcomputer 19 discriminates whether or not the value registered at step SP62 is the value 0. If an affirmative result is obtained, then since this signifies that no free slot exists, the processing advances from step SP64 to step SP65, at which the system controlling microcomputer 19 sets the valid/invalid flag to valid to add a slot to the index file. Then at step SP66, the system controlling microcomputer 19 registers information of the various attributes into the added slot. Then at step SP67, the system controlling microcomputer 19 sets various kinds of reference information correctly. Thereafter, the processing returns to step SP63.

On the other hand, if a free slot is detected, then since a negative result is obtained at step SP64, the system controlling microcomputer 19 advances the processing from step SP64 to step SP68, at which it sets the valid/invalid flag for the slot pointed to by the variable of the sibling entry number to valid. Further at step SP69, the system controlling microcomputer 19 discriminates whether or not an entry number of another free slot is set in the sibling entry number of the slot. If a negative result is obtained, then the system controlling microcomputer 19 advances the processing from step SP69 to step SP70, at which it sets the variable of the sibling entry number to the value 0. Thereafter, the processing advances to step SP66, at which the system controlling microcomputer 19 registers the attribute information into the slot whose valid/invalid flag is set to valid. Then at step SP67, the system controlling microcomputer 19 sets the reference information.

On the other hand, if an affirmative result is obtained at step SP69, then the processing advances to step SP71, at which the system controlling microcomputer 19 sets the slot number of another free slot detected at step SP69 as the variable of the sibling entry number. Further, the system controlling microcomputer 19 detects a slot whose sibling entry number indicates the free slot having the valid/invalid flag set to valid at step SP68 and registers the variable of the sibling entry number into the sibling entry number of the slot thereby to set so that the sibling entry numbers may exhibit a circulation among the remaining free slots. Thereafter, the processing advances to step SP66.

In the present embodiment, since sibling entry numbers exhibit a circulation also among free slots, the detection process for free slots can be simplified, and the hierarchical structure can be grasped readily as much and the extract information can be registered simply and easily.

6. Other Embodiments

It is to be noted that, while in the first embodiment and so forth described hereinabove, reference information is set simultaneously with a process of the valid/invalid flag, the present invention is not limited to this, and reference information may otherwise be set making use of free time when necessary.

Further, in the third and fourth embodiments described hereinabove, as a case wherein the settings of the parent entry number and the child entry number are contradictory to each other, the case is described wherein both of them are set to the value 0 so as to point to a slot of the root folder. However, the present invention is not limited to this, and where the case wherein the parent entry number and the child entry number point to the same slot in this manner is determined as a reference for processing, any other value than the value 0 may be set alternatively.

Further, in the embodiments described above, various pieces of extract information are retained in an internal file reference form. However, the present invention is not limited to this but can be applied widely also where entries are set to an external file to form an index file.

Further, in the embodiments described above, an index file is produced in the form of a QuickTime movie file. However, the present invention is not limited to this but can be applied widely also where an index file is formed in various formats.

Further, in the embodiments described hereinabove, the present invention is applied to an optical disk apparatus which records a result of image pickup, an output of a personal computer and so forth. However, the present invention is not limited to this but can be applied widely to such a case wherein a large number of files recorded on various recording media such as a magneto-optical disk or a hard disk apparatus are managed or to another case wherein a large number of files retained in a predetermined server are managed or further to a like case.

Further, in the embodiments described hereinabove, management object files each in the form of a QuickTime movie file are managed. However, the present invention is not limited to this but can be applied widely also where files of video data, files of audio data or like files of various formats are managed.

Further, in the embodiments described hereinabove, a series of processes are executed in accordance with a processing program installed in advance in the system controlling microcomputer 19. However, the present invention is not limited to this but can be applied widely also where such a program as mentioned above is provided in the form of a recording medium or through a network such as the Internet and a series of processes are executed in accordance with the program. It is to be noted that, for such a recording medium as mentioned above, various recording media such as an optical disk and a magnetic tape can be applied widely.

While preferred embodiments of the present invention have been described using specific terms, such description is for illustrative purposes only, and it is to be understood that changes and variations may be made without departing from the spirit or scope of the following claims.

What is claimed is:

1. A recording apparatus for recording on a recording medium electronic files and an index file to assist in the subsequent reproduction of a recorded file, said recording apparatus comprising: means for recording desired files on said recording medium; means for updating an index file recorded on the recording medium in response to recording of any of the files; the index file being formed from a train of slots of extract information of the flies and a folder or folders; each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid; and means for setting the valid/invalid flag of a predetermined one of the slots which is in a state set to valid with the valid/invalid flag to invalid to set the slot as a free slot while settings of the higher hierarchy, lower hierarchy and same hierarchy reference information of the slot are maintained.

2. A recording apparatus according to claim 1, further comprising: means for detecting the free slot in which the higher hierarchy, lower hierarchy and same hierarchy reference information are set so as to be compatible with a destination of registration; and means for setting the valid/invalid flag in the free slot to valid while the settings of the higher hierarchy, lower hierarchy and same hierarchy reference information are maintained and allocating corresponding extract information to the free slot to register the extract information into the index file.

3. A recording apparatus according to claim 1, wherein the higher hierarchical reference information is a parent entry number pointing to the slot corresponding to the closest folder to which a corresponding file or folder belongs while the lower hierarchy reference information is a child entry number which points, where the slot retains the extract information corresponding to a folder, to the slot corresponding to the closest folder or file which belongs to the folder, but indicates, where the slot retains the extract information corresponding to a file, a predetermined value, and the same hierarchy reference information is a sibling entry number successively and circulatively pointing to another one of those slots which correspond to files and folders of the same hierarchy which belong to the corresponding folder or the folder same as that of the file.

4. A recording apparatus for recording on a recording medium electronic files and an index file to assist in the subsequent reproduction of a recorded file, said recording apparatus comprising: means for recording desired files on said recording medium; means for updating an index file recorded on the recording medium in response to recording of any of the files; the index file being formed from a train of slots of extract information of the files and a folder or folders; each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid; means for setting the higher hierarchy, lower hierarchy and same hierarchy reference information so as to be inconsistent with regard to a predetermined one of the slots; means for setting the valid/invalid flag of the predetermined slot to valid and allocating the extract information to the predetermined slot; and means for registering the extract information into the index file.

5. A recording apparatus according to claim 4, wherein settings of the higher hierarchy, lower hierarchy and same hierarchy reference information are such that the higher hierarchy reference information and the lower hierarchy reference information point to the same slot.

6. A recording apparatus according to claim 4, wherein settings of the higher hierarchy, lower hierarchy and same hierarchy reference information are such that the same hierarchy reference information points to a slot which does not exist in the same hierarchy.

7. A recording apparatus according to claim 4, further comprising: means for detecting those of the slots in which the higher hierarchy, lower hierarchy and same hierarchy reference information which exhibit inconsistency are set; and means for collectively displaying files corresponding the detected slots.

8. A recording apparatus according to claim 4, further comprising: means for detecting those of the slots in which the higher hierarchy, lower hierarchy and some hierarchy reference information which exhibit inconsistency are set; and means for updating the reference information of the detected slots and those of the slots associated with the detected slots so that the detected slots may belong to a predetermined folder.

9. A recording apparatus for recording on a recording medium electronic files and an index file to assist in the subsequent reproduction of a recorded file, said recording apparatus comprising: means for recording desired files on said recording medium; means for updating an index file recorded on the recording medium in response to recording of any of the files; the index file being formed from a train of slots of extract information of the files and a folder or folders; each of the slots having set therein higher hierarchy reference information pointing to another slot of a higher hierarchy, lower hierarchy reference information pointing to a further slot of a lower hierarchy, same hierarchy reference information pointing to a still further slot of the same hierarchy and a valid/invalid flag representative of whether the slot is valid or invalid; the higher hierarchical reference information being a parent entry number pointing to the slot corresponding to the closest folder to which a corresponding file or folder belongs; the lower hierarchy reference information being a child entry number which points, where the slot retains the extract information corresponding to a folder, to the slot corresponding to the closest folder or file which belongs to the folder, but indicates, where the slot retains the extract information corresponding to a file, a predetermined value; the same hierarchy reference information being a sibling entry number successively and circulatively pointing to another one of those slots which correspond to files and folders of the same hierarchy which belong to the corresponding folder or the folder same as that of the file; means for setting the valid/invalid flag of any of the slots to invalid to set the slot as a free slot; and means for setting the reference information of the free slot and the remaining free slots such that each of the sibling entry numbers of the free slot arid the remaining free slots may successively and circulatively point to another one of the free slot and the remaining free slots.

* * * * *